(12) United States Patent
Bender

(10) Patent No.: US 7,272,138 B2
(45) Date of Patent: Sep. 18, 2007

(54) METHOD AND APPARATUS FOR PROVIDING MOBILITY WITHIN A NETWORK

(75) Inventor: Paul E. Bender, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 980 days.

(21) Appl. No.: 10/002,537

(22) Filed: Nov. 15, 2001

(65) Prior Publication Data

US 2002/0041568 A1    Apr. 11, 2002

(51) Int. Cl.
*H04L 12/56* (2006.01)

(52) U.S. Cl. .................. 370/390; 370/392

(58) Field of Classification Search ............ 455/432.1; 370/395.31, 400, 395.52
See application file for complete search history.

(56) References Cited

U.S. PATENT DOCUMENTS

| | | | |
|---|---|---|---|
| 5,995,503 A * | 11/1999 | Crawley et al. | 370/351 |
| 6,195,705 B1 * | 2/2001 | Leung | 709/245 |
| 6,272,129 B1 * | 8/2001 | Dynarski et al. | 370/356 |
| 6,707,809 B1 * | 3/2004 | Warrier et al. | 370/351 |
| 6,801,496 B1 * | 10/2004 | Saleh et al. | 370/221 |
| 6,850,486 B2 * | 2/2005 | Saleh et al. | 370/218 |
| 6,856,627 B2 * | 2/2005 | Saleh et al. | 370/397 |
| 6,862,446 B2 * | 3/2005 | O'Neill et al. | 455/422.1 |
| 6,915,345 B1 * | 7/2005 | Tummala et al. | 709/225 |
| 6,947,400 B2 * | 9/2005 | Heller | 370/331 |
| 7,002,917 B1 * | 2/2006 | Saleh | 370/238 |

FOREIGN PATENT DOCUMENTS

WO    9847302    10/1998

OTHER PUBLICATIONS

Route optimization and location updates for mobile hosts; Weidong Chen; Lin, E.; Distributed Computing Systems, 1996., Proceedings of the 16th International Conference on May 27-30, 1996 pp. 319-326.*

(Continued)

*Primary Examiner*—Hassan Kizou
*Assistant Examiner*—Salman Ahmed
(74) *Attorney, Agent, or Firm*—Kam T. Tam; Larry J. Moskowitz; Thomas R. Rousa

(57) ABSTRACT

A novel method and apparatus is presented for providing transparent mobility of an entity within a network, by allowing the entity, which has a communication path set up between it and a peer entity, to move from one location to another, without informing the peer entity of this movement, and without having the communication path broken. The invention is applicable to decentralized networks using IP protocols, and is particularly applicable on networks where the mobility mechanism neither introduces latency nor decreases the available bandwidth of the network. In the invention, neither is latency increased nor is bandwidth utilization increased, as is done in other mobility models. Additionally, the invention utilizes standard protocols that are widely available from a plurality of equipment manufacturers on a variety of platforms. Thus, the invention provides a very cost-effective model for network providers that need to support transparent mobility within their networks.

20 Claims, 16 Drawing Sheets

OTHER PUBLICATIONS

OSPF Design Guide☐☐OSPF Design Guide; Cisco Systems; Network Supported Accounts Rev: 1.1 Apr. 1996; Sam Halabi.*

RFC 2676—QoS Routing Mechanisms and OSPF Extensions, 1996.*

Moy (OSPF Version 2, Request for Comments: 1583, Mar. 1994).*

Route Optimization and Location Updates for Mobile Hosts, Distributed Computing Systems, 1996., Proceedings of the 16th International Conference on May 27-30, 1996.*

OSPF Version 2, Request for Comments: 1583, Mar. 1994.*

Li, Yalun "Protocol Architecture for Universal Personal Computing" IEEE Journal on Selected Areas in Communications 15(8): 1467-1476 (1997).

Valko, Andras "Cellular IP: A New Approach to Internet Host Mobility" Computer Communications Review 29(1): 50-65 (1999).

TIA/EIA/IS-707A.8 "Data Service Options for Spread Spectrum Systems: Radio Link Protocol Type 2" pp. 1-1:4:12 (Mar. 1999).

C. Perkins, Editor "IP Mobility Support", Network Working Group, pp. 1-79 (Oct. 1996).

J. Moy, Editor "OSPF Version 2", Network Working Group, pp. 1-244 (Apr. 1998).

* cited by examiner

METHOD AND APPARATUS FOR PROVIDING MOBILITY WITHIN A NETWORK

CROSS REFERENCE OF APPLICATION

This application claims priority from U.S. application Ser. No. 09/451,400, filed Nov. 30, 1999, entitled "Method and Apparatus for Providing Mobility Within a Network" which claims priority from Provisional Application Ser. No. 60/163,325, filed Nov. 3, 1999, both currently assigned to the assignee of the present application.

BACKGROUND OF THE INVENTION

I. Field of the Invention

The current invention relates to mobility within a telecommunications system. More particularly, the present invention relates to a method and apparatus for transparently relocating an anchor point within the serving network of a wireless telecommunications system from one location to another.

II. Description of the Related Art

The use of a decentralized serving network for use in a wireless telecommunications system is disclosed in U.S. Pat. No. 6,215,779, entitled "DISTRIBUTED INFRASTRUCTURE FOR WIRELESS DATA COMMUNICATIONS", applied for by the applicant of the present invention, and incorporated by reference herein. The above application discusses a telecommunications decentralized serving network in which, rather than there being a single point of control, there are multiple control points distributed throughout the serving network of the telecommunications system.

The Internet Engineering Task Force (IETF) is the standards body that creates the majority of standards related to the Internet Protocol (IP). Many of the standards created by the IETF are called RFCs. RFC is shorthand for 'Request For Comments.'

Open Shortest Path First (OSPF) was standardized by the IETF to address, in part, the routing of packets in a network in which one or more of the routers experiences a failure, thus enhancing the reliability of a network. OSPF was designed in such a way that, of all the routers which are working at any given moment, the shortest path is taken from node A to node B. Additionally, OSPF was designed such that, if multiple equivalent routes exist from node A to node B, any one of the equivalent routes can be selected. With OSPF in place, a network with redundant routes can perform load balancing on the routers. OSPF is available on many makes and models of routers, and is described in IETF RFC 2328, incorporated by reference herein.

Mobile IP is present in many IETF standards to make it possible for a device, containing an IP address, to travel through a network (or networks). The standard, RFC 2002, 'IP Mobility Support,' incorporated by reference herein, addresses the problem of IP Mobility, and uses a solution termed 'Mobile IP.' Several other Mobile IP related standards also exist, such as RFCs 2006, 2041, 2290, 2344, and 2356, each of which is incorporated by reference herein. Local Area Network (LAN) system administrators that want to support mobility are guided by the IETF standards to use Mobile IP. Mobile IP provides support not only for mobility within a LAN, but also for mobility within a Wide Area Network (WAN).

In a decentralized telecommunications network, the service devices chosen are widely available off-the-shelf units that use open standards for their interfaces rather than proprietary protocols that are limited to a single supplier. Many, if not all, of the service devices are designed to communicate with a single anchor point for each active session. Meaning, such off-the-shelf devices, and the protocols they incorporate, are not designed to begin a session with one device and ends the same session with a different device. This restriction can lead to non-optimized routing for individual sessions. Such non-optimized routing situations are illustrated in FIG. 8A and FIG. 8B. What is needed is a method by which a service device's anchor point for an active session can be relocated without the need for specific anchor point relocation support in the service device. Specifically, such a method should be very efficient and robust, minimizing latency and bandwidth usage.

SUMMARY OF THE INVENTION

The present invention is a novel method and apparatus for providing transparent mobility of an entity within a serving network of a wireless telecommunications system. The invention provides for the transparent mobility of a data anchor point within a network, allowing the anchor point to move from one physical location of the network to another physical location of the network. The type of mobility is termed 'transparent' because the peer entity communicating with the anchor point doesn't receive a message indicating that the anchor point has moved, nor is the peer entity required to perform any special functions to remain in communication with an anchor point that has moved from one location to another. In other words, the peer entity communicating with the data anchor point performs no differently in a session in which the anchor point remains fixed than it does in a session in which the anchor point changes physical locations.

The present invention is applicable to decentralized networks in which transparent mobility is desired. The present invention is particularly applicable on networks wherein it is desired that the mobility mechanism neither introduces latency nor decreases the available bandwidth of the network. Such networks include, but are not limited to, a CDMA wireless data network and a GSM wireless data network.

All embodiments of the present invention are novel methods and apparatus for handling mobility within a serving network of a wireless telecommunications system. The exemplary embodiment of the present invention has broader applicability, in that it provides a novel method for handling mobility in all types of networks, including corporate and government networks. Other mobility models can require a centralized network to manage anchor point mobility. Additionally, other mobility models can use of a significant amount of available bandwidth and can significantly increase latency. The present invention neither has deleterious latency nor bandwidth effects. Additionally, the present invention utilizes standard protocols that are widely available from a plurality of equipment manufacturers on a variety of platforms. Thus, the present invention provides a very cost-effective model for network providers that desire to support transparent mobility within their network.

The exemplary embodiment of the present invention uses OSPF to achieve transparent anchor point mobility. Mobile IP is used in an alternative embodiment of the present invention to provide transparent anchor point mobility in the serving network of a wireless telecommunications system. OSPF is used in the exemplary embodiment of the present invention because the use of OSPF does not introduce the tunneling overhead that is introduced in Mobile IP, and OSPF does not introduce the latency that can be caused by the indirect routing common in Mobile IP.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
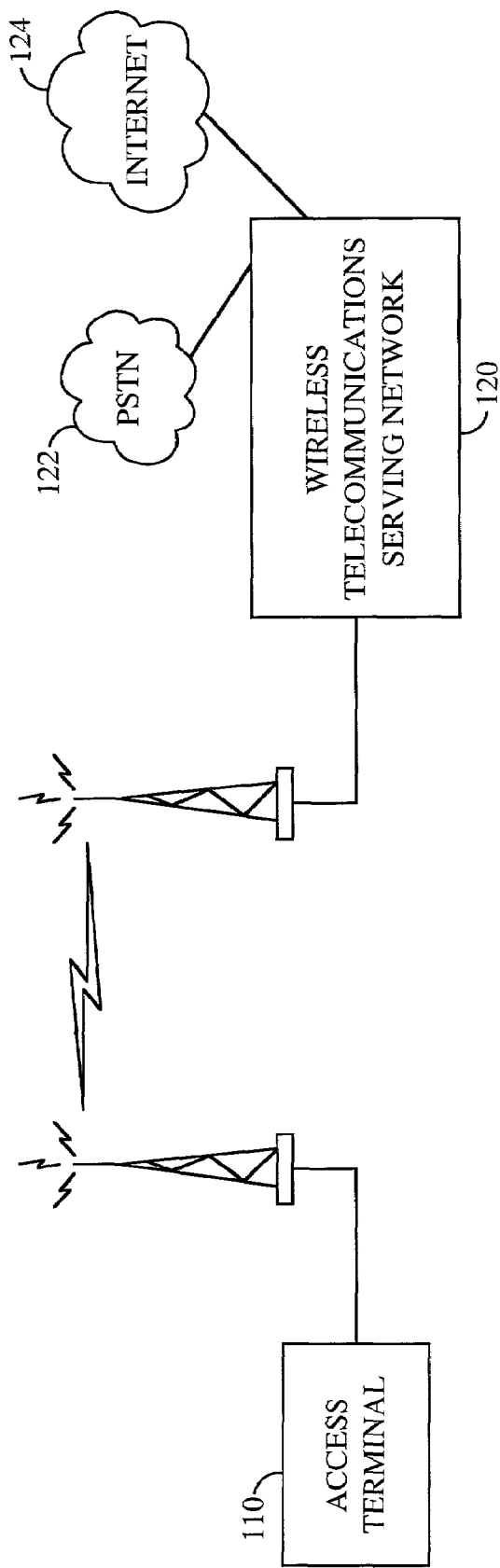
FIG. 1 is a block diagram of exemplary embodiment of an Access Terminal in communications with a Wireless Telecommunications Decentralized Serving Network.

FIG. 1 is a block diagram of exemplary embodiment of an Access Terminal in communications with a Wireless Telecommunications Decentralized Serving Network. Access terminal 110 is a wireless terminal that can be used to access one or more of a plurality of services, including Public Switched Telephone Network (PSTN) and Internet services, offered by the serving network of a wireless telecommunications system 120. Wireless telecommunications system 120, and PSTN 122 and Internet 124 to which wireless telecommunications system 120 connects, are further described in reference to FIG. 2. In the exemplary embodiment, access terminal 110 is able to connect to the serving network of a wireless telecommunications system via the use of a radio antenna. Access terminal 110 can maintain a communication link with the serving network of a wireless telecommunications system by communicating with one or more access points, further described in reference to FIG. 2 and FIG. 3.

Figure 2:
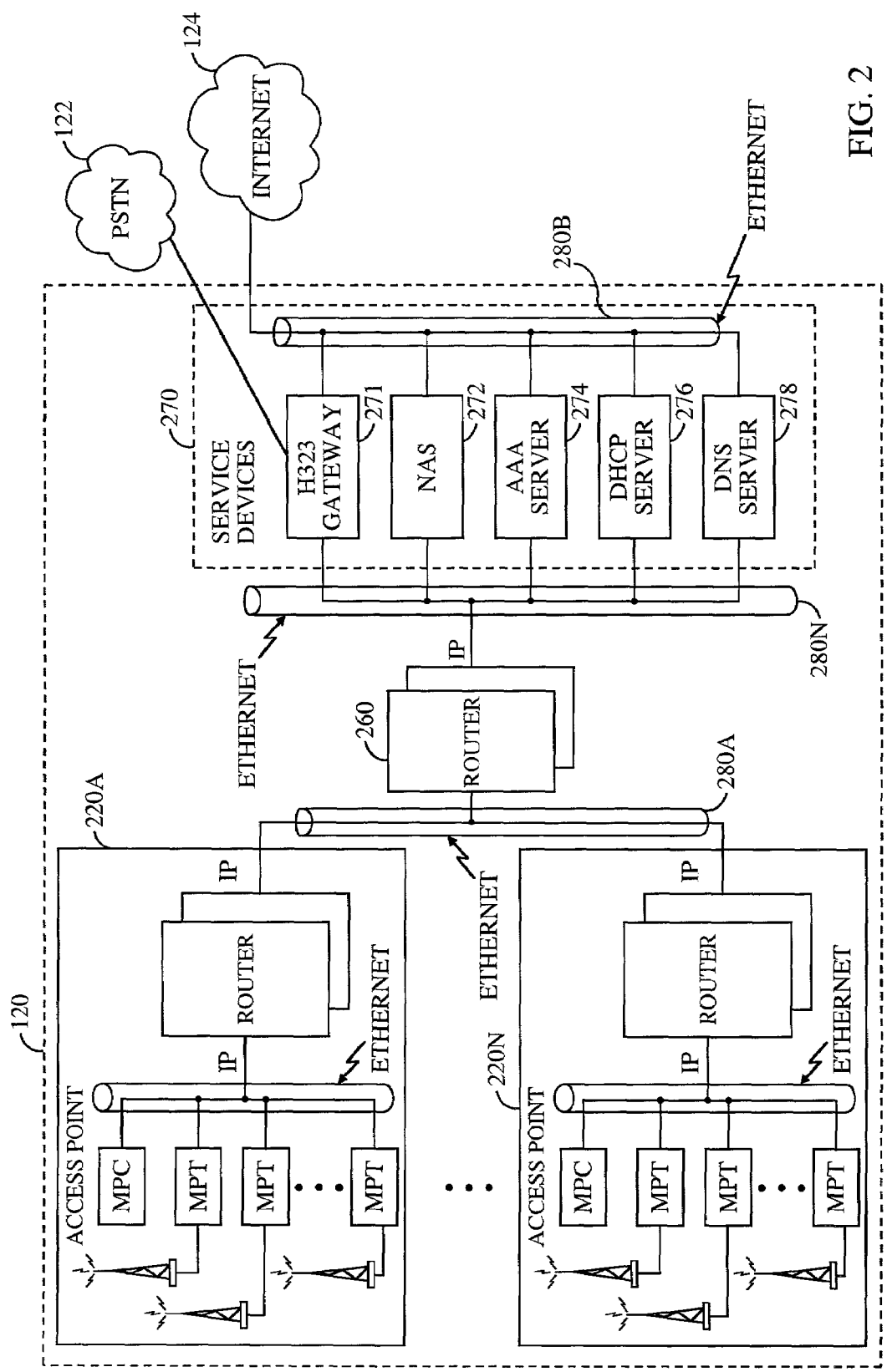
FIG. 2 is a functional block diagram of an exemplary embodiment of a decentralized serving network of a wireless telecommunications system.

FIG. 2 is a functional block diagram of an exemplary embodiment of a decentralized serving network of a wireless telecommunications system, hereinafter also referred to as network 120. Access terminal 110 can communicate with network 120 over a wireless link.

Figure 3:
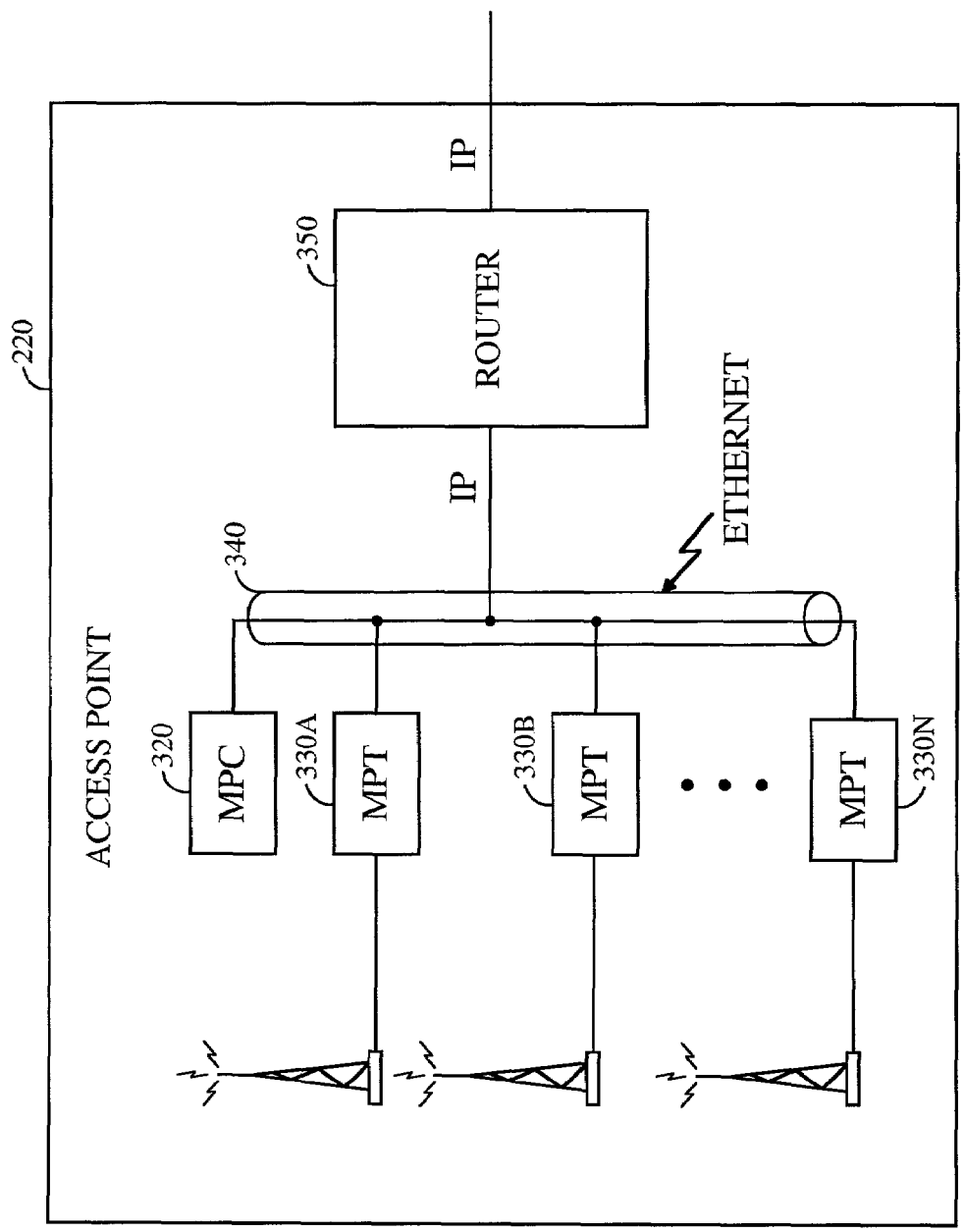
FIG. 3 is a functional block diagram of an exemplary embodiment of an access point.

Network 120 is comprised of a plurality of access points 220, which can communicate with access points 110, and are further described in reference to FIG. 3. Additionally, network 120 is further comprised of one or more router(s) 260, which connect access points 220 to service devices 270. Service Devices 270 are connected to PSTN 122 and Internet 124. Although network 120 connects to external entities PSTN 122 and Internet 124 in FIG. 2, the invention is not limited to a network which connects to these entities. One skilled in the art would know that other entities, such as a private external information provider, or a billing service entity, could be connected to network 120 as well. Additionally, it is not required that either PSTN 122 or Internet 124 be connected to network 120. PSTN 122 and Internet 124 were put in FIG. 2, to give an illustration of the type of entities to which network 120 could be connected.

PSTN 122 represents the Public Switched Telephone Network, the aggregate of all of the circuit switched voice networks throughout the world. The term PSTN is well known to those experienced in the field of telecommunications.

Internet 124 represents the public Internet, a network of computers that spans the world and is used by individuals, governments, corporations, and organizations to share information amongst computers and computing devices. The term Internet is well know to those experience in the field of telecommunications.

H323 Gateway 271 provides H.323 services in accordance with the H.323 standard, thus providing standardized multimedia communications over a network. The H.323 standard was developed by the International Telecommunications Union, and is described in ITU-T Recommendation H.323. H.323 Gateway is connected to PSTN 122 and Internet 124. One skilled in the art of the related fields would be familiar with the services provided by an H323 Gateway.

NAS 272 is a Network Access Server. NAS 272 provides packet data services in accordance with the IETF Internet Draft "Network Access Server Requirements Next Generation (NASREQNG) NAS Model." One skilled in the art of the related fields would be familiar with the services provided by a Network Access Server.

AAA Server 274 provides Authentication, Authorization, and Accounting services. A RADIUS server is one example of an AAA server, and is described in IETF RFC 2138. One skilled in the art of the related fields would be familiar with the services provided by an AAA server.

DHCP Server 276 provides dynamic host configuration services in accordance with the Dynamic Host Configuration Protocol, which is described in IETF RFC 2131. One skilled in the art of the related fields would be familiar with the services provided by a DHCP server.

DNS Server 278 provides Domain Name Services. DNS is described in "Internetworking with TCP/IP Volume I, Principles, Protocols, and Architecture," by Douglas E. Comer. One skilled in the art of the related fields would be familiar with the services provided by a DNS server.

All of the above devices are "off-the-shelf" and use standard, non-proprietary protocols.

Although the illustration of Service Devices 270 contains H323 Gateway 271, NAS 272, AAA Server 274, DHCP Server 276, and DNS Server 278, the invention is not limited to a network which contains exactly these service devices. One skilled in the art would know that other services, such as a Web page server, could be one of the service devices in Service Devices 270. Additionally, it is not required that any or all of the service devices illustrated in Service Devices 270 be present. These chosen devices were illustrated to give an example of the type of entities that could be contained in Service Devices 270.

Network 120 connects Access Points 220 and Service Devices 270 together via various Ethernet connections and the use of a router 260. Router 260 is an off-the-shelf router which routes (forwards) packets received from one physical interface to one or more other interfaces using an internal process to determine to which interface to forward each received packet. Routers are well known to those skilled in the art, and are often referred to by other names, such as gateways or switches. In the exemplary embodiment of the invention, router 260 is an off-the-shelf router which forwards IP (Internet Protocol) packets received from a plurality of Ethernet transports 280 to one or more of said Ethernet transports 280. In the exemplary embodiment, router 260 supports the OSPF routing protocol. Ethernet is defined in IEEE 802.3, a standard published by the Institute of Electrical and Electronic Engineers (IEEE). The OSPF routing protocol is described in IETF RFC 2328. The OSPF routing protocol allows standard messages to be sent between routers to update their routing tables, such that IP packets can be delivered via the data path that has the lowest cost (the term 'cost' is described in IETF RFC 2328). The OSPF protocol has an age field that is transmitted in each Link State Advertisement message. The age field indicates to a receiving router how long the Link State Advertisement should remain valid for. A receiving router associates an age with the Link State Advertisement consistent with the age field received in a Link State Advertisement. A receiving router increments the associated ages for its routes as time passes. A receiving router compares these ages with the maximum age. Once an age associated with a route reaches the maximum age, the route is deleted. Hereinafter, the maximum age is referred to as MaxAge, as is per the description in IETF RFC 2328. One skilled in the art of data networks would be familiar with Ethernet, IP, and OSPF.

Although the illustration of network 120 connects access points 220, router 260, and Service Devices 270, via an IP over Ethernet transport 280, the invention is not limited to a network with a sole transport mechanism consisting of IP over Ethernet. One skilled in the art of networking is familiar with an ethernet transport 280 that is used to carry IP packets from one point on a network to another. One skilled in the art would know that other transports, such as Asynchronous Transfer Mode (ATM), could be used as a transport over all or a portion of network 120, in an alternative embodiment. Although, in the exemplary embodiment, network 120 consists of two subnets divided by a single router 260, an alternative embodiment could consist of two or more routers 260, connecting two or more subnets.

FIG. 3 is a functional block diagram of an exemplary embodiment of an Access Point. Access Point 220 is the portion of network 120 that receives data from a service device 270 and creates capsules and transmits them over a wireless link to an access terminal 110.

Figure 4:
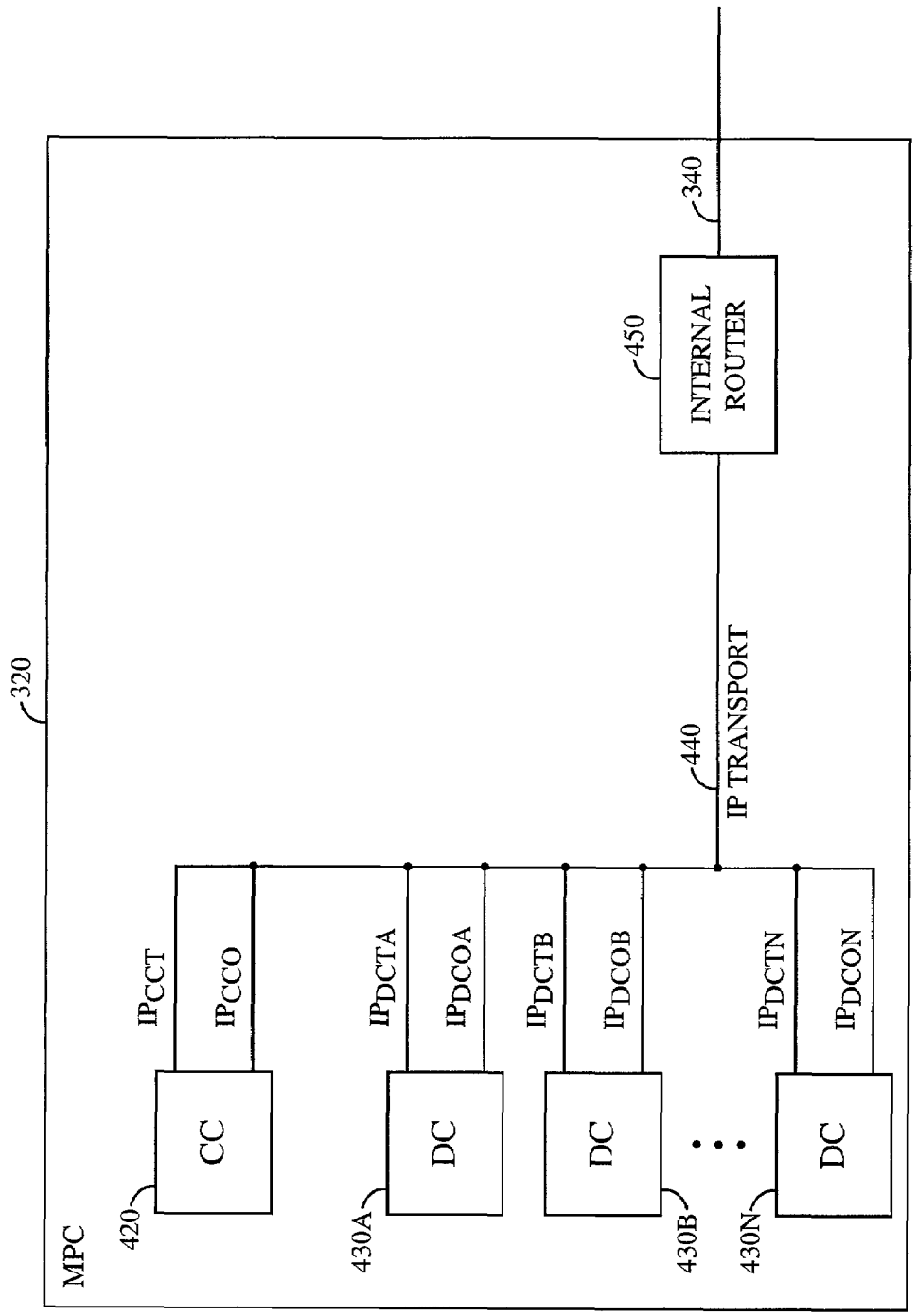
FIG. 4 is a functional block diagram of an exemplary embodiment of a modem pool controller.
Figure 5:
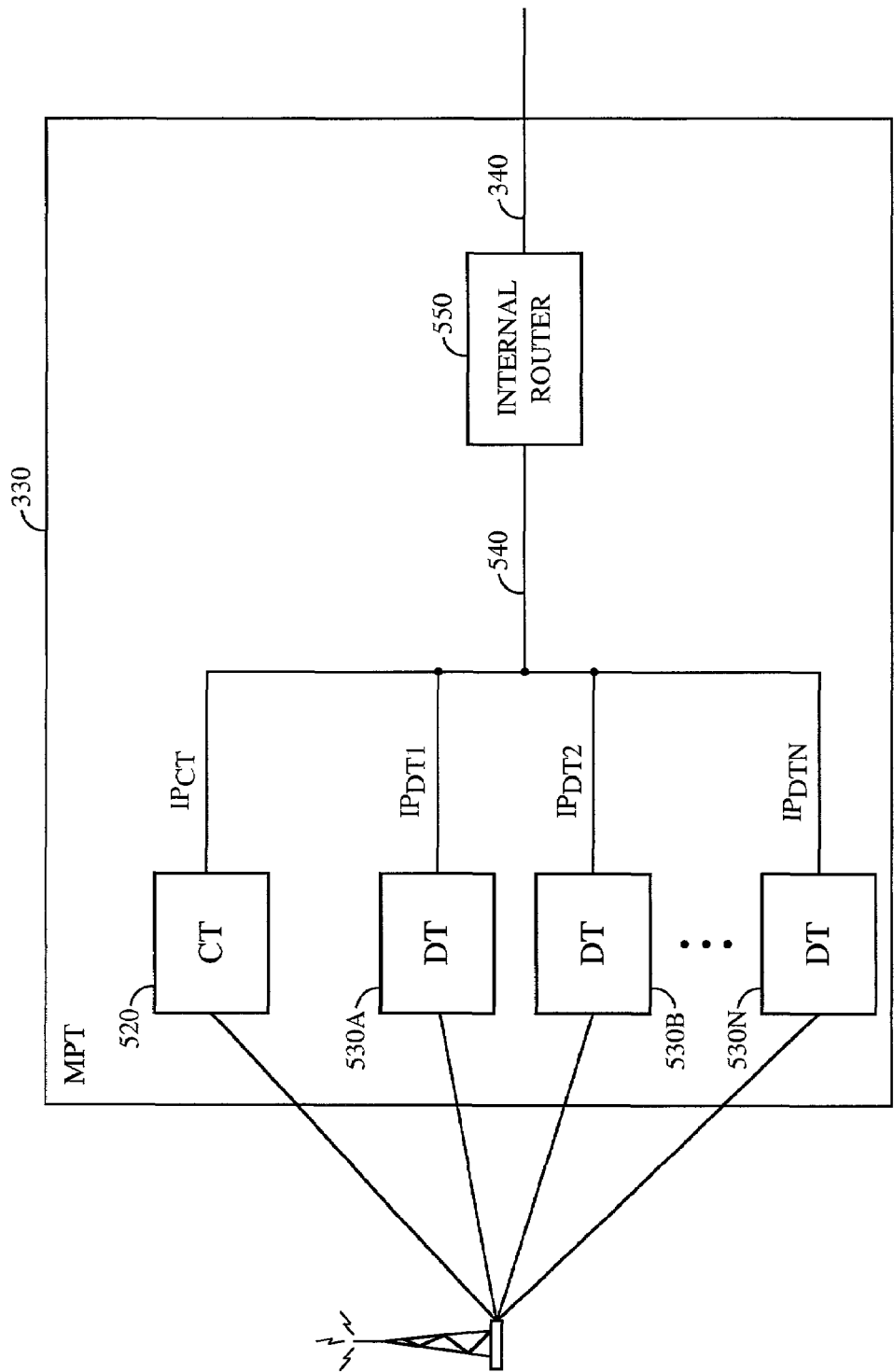
FIG. 5 is a functional block diagram of an exemplary embodiment of a modem pool transceiver.

Access point 220 consists of a single MPC 320, further described in reference to FIG. 4, and zero or more MPTs 330 connected each of which is connected to an antenna, further described in reference to FIG. 5. In the exemplary embodiment, MPC 320 and MPTs 330 are connected to router 350 via IP over Ethernet transport 340.

Although the illustration of Access Point 220 connects MPC 320 and MPTs 330 via an IP over Ethernet transport 340, the invention is not limited to such a transport. In one alternative embodiment, an ATM transport is used. In another alternative embodiment, MPC 320, MPTs 330, and router 350 are located on a single processing unit, and the router receives packets from these logical memory units via memory functions and signaling internal to the processor. One skilled in the art would know that several other transports are available as well.

FIG. 4 is a functional block diagram of an exemplary embodiment of a Modem Pool Controller (MPC) 320. MPC 320 is analogous to a Base Station Controller plus a Visitor Location Register (VLR), known to those skilled in the art of wireless telecommunication. Whereas a Base Station Controller controls certain functions in a centralized serving network of a wireless telecommunications system, MPC 320 performs many of those same functions in the exemplary decentralized network. For example, MPC 320 handles connection control for access terminals 110, and also handles the implementation of the Radio Link Protocol (RLP). An RLP provides a means for transporting a data stream between a remote station and wireless telecommunications system. As is known to one skilled in the art, an RLP used for the TIA/EIA/IS-95B is described in Radio Link Protocol (RLP) is described in TIA/EIA/IS-707-A.8, entitled "DATA SERVICE OPTIONS FOR SPREAD SPECTRUM SYSTEMS: RADIO LINK PROTOCOL TYPE 2", incorporated by reference herein. MPC 320 also handles a plurality of processes unique to the decentralized network and the present invention, especially in regards to the present invention. The process of the present invention will be described in great detail in relation to FIGS. 9A-9B.

For each active Internet data connection associated with a given MPC 320, MPC 320 generates capsules to be transmitted by one or more MPTs 330, and ships these capsules to MPT 330. Likewise, when MPC 320 receives a capsule from one or MPTs 330, it unencapsulates the payload of the capsule and processes the data. MPC 320 contains one Common Controller (CC) 420 and zero or more dedicated controllers (DCs) 430. Each dedicated controller 430 functions as an anchor point to the service device(s) 270 to which it is connected.

Exactly one CC 420 exists for each instance of MPC 320. As illustrated in FIG. 4, CC 420 is assigned two unique IP addresses, $IP_{CCT}$ and $IP_{CCO}$. One of these IP addresses, $IP_{CCT}$, is used when communicating with MPTs 330. The other IP address, $IP_{CCO}$, is used when communicating with entities present in network 120 other than MPTs 330.

Each time a session between an access terminal 110 and a network 120 starts, CC 420 dynamically allocates resources for a DC 430. Each DC 430 handles the generation of and the reception of capsules associated with the access terminal with which it is associated. Each time a session between an access terminal 110 and a network 120 ends, CC 420 deletes the instance of DC 430. Whenever an instance of DC 430 is deleted, the resources previously allocated to that instance are deallocated. As illustrated, a plurality of zero or more DCs 430 can coexist within MPC 320 at any given time.

Each time CC 420 allocates resources for an instance of DC 430, the instance of DC 430 is assigned two unique IP addresses, $IP_{DCT}$ and $IP_{DCO}$. One of these IP addresses, $IP_{DCT}$, is used when communicating with MPTs 330. The other IP address, $IP_{DCO}$, is used when communicating with entities present in network 120 other than MPTs 330, such as NAS 272. In blocks 430A, 430B, and 430N, the characters 'A', 'B', and 'N', respectively, have been added to the subscripts of each of the IP addresses. This was done to illustrate that, in the exemplary embodiment, at any given point in time in which multiple instances of DC 430 exist within MPC 320, each such instance has its own unique pair of IP addresses.

CC 420 and DCs 430 send and receive messages over IP transport 440 to Internal Router 450. In the exemplary embodiment, IP transport 440 is a memory bus over which IP packets can travel from one process to another and to an interface card. Internal Router 450 is a network interface card, which routes IP packets to/from IP transport 440 and external transport 340. The invention is not limited to this embodiment. As one skilled in the art would know, there are other embodiments, such as Ethernet, which could be used to transport IP packets within MPC 320 and external transport 340.

FIG. 5 is a functional block diagram of an exemplary embodiment of a Modem Pool Transceiver (MPT) 330. MPT 330 handles the transmitting and receiving of capsules to/from access terminal 110. In the exemplary embodiment, communications between MPT 330 and access terminal 110 utilize variable rate spread spectrum techniques as described in U.S. patent application Ser. No. 08/963,386 entitled "Method and Apparatus for High Rate Packet Data Transmission" filed on Nov. 3, 1997, assigned to the assignee of the present invention and incorporated by reference herein. MPT 330 contains one common transceiver (CT) 520 and a plurality of zero or more dedicated transceivers (DTs) 530, each of which is capable of performing the spread spectrum modulation and demodulation used for communications with one or more access terminals.

In the exemplary embodiment, exactly one CT 520 exists for each instance of MPT 330. As illustrated in FIG. 5, CT 520 is assigned one unique IP addresses, $IP_{CT}$, to communicate with entities present in network 120.

Each time it is desired to open a dedicated communication link between an access terminal 110 and an MPT 330, CT 520 dynamically creates an instance of DT 530. Each DT 530 handles the transmission/reception of capsules associated with the dedicated communication link to an access terminal 110. Each time it is desired to close a dedicated communication link between an access terminal 110 and an MPT 330, CT 520 deletes the instance of DT 530. As illustrated in FIG. 5, a plurality of zero or more DTs 530 can coexist within MPT 330 at any given time.

Each instance of DT 530 is assigned its own unique IP address $IP_{DT}$ used to communicate with entities present in network 120. In blocks 530A, 530B, and 530N, the characters 'A', 'B', and 'N', respectively, have been added to the subscripts of each of the IP addresses. This was done to illustrate that, in the exemplary embodiment, at any given point in time in which multiple instances of DT 530 exist within MPT 330, each such instance has its own unique IP addresses. In other words, the IP addresses assigned to each concurrent instance of MPT 330 are not the same.

CT 520 and DTs 530 send and receive messages over IP transport 540 to Internal Router 550. In the exemplary embodiment, IP transport 540 is a memory bus over which IP packets can travel from one process to another and to an interface card. Internal Router 550 is a network interface card, which routes IP packets to/from IP transport 540 and Ethernet 340. The invention is not limited to this embodiment. As one skilled in the art would know, there are other embodiments, such as ATM, which could be used to transport IP packets within MPT 330 and external transport 340.

Additionally, transceivers CT 520 and DT 530 have the ability to transmit and receive data to access terminals via the use of one common antenna, as illustrated. In an alternative embodiment, transceivers CT 520 and DT 530 have the ability to transmit and/or receive data via the use of a plurality of two or more antennas.

Figure 6A:
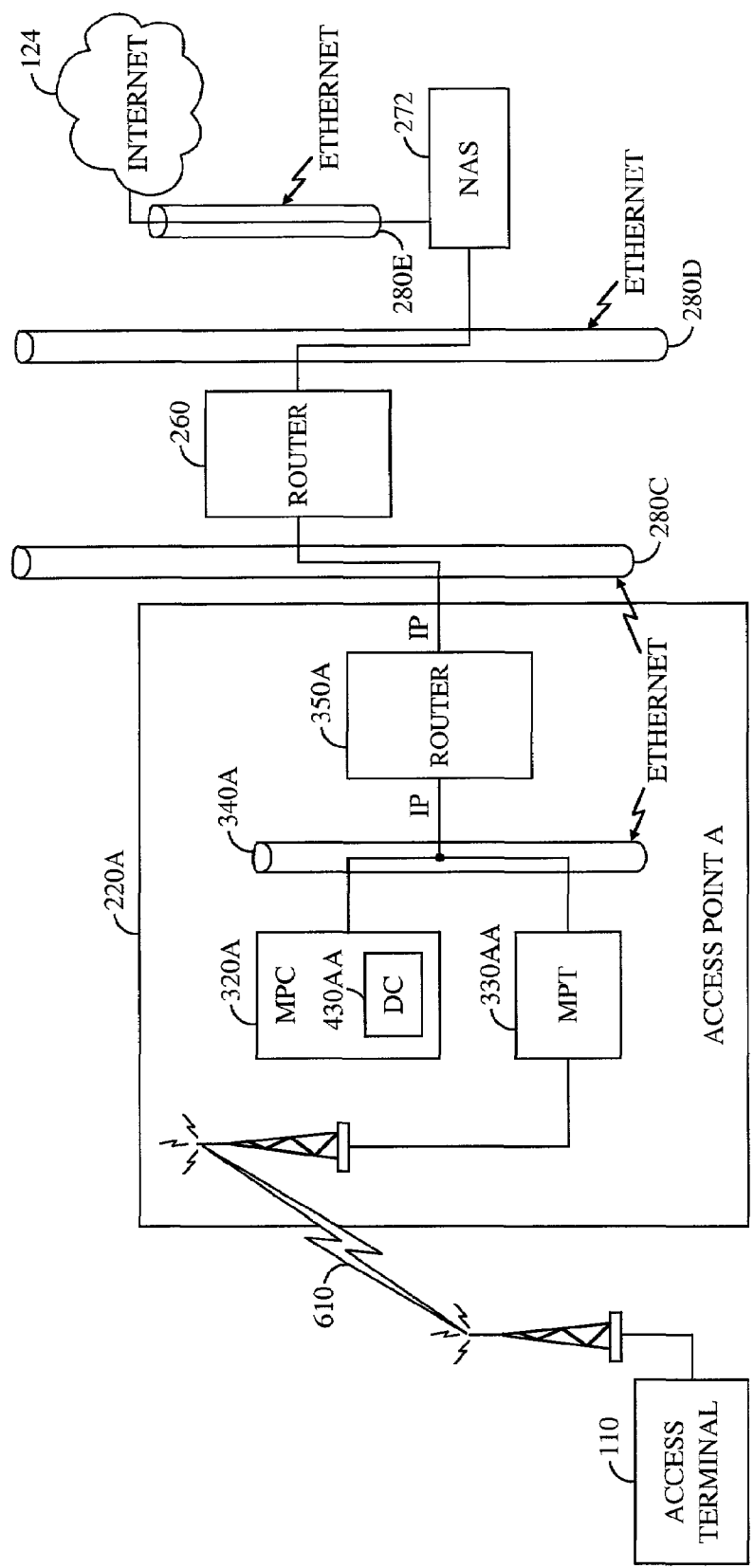
FIG. 6A is a network diagram of an exemplary embodiment of the data path from an access terminal to the internet, wherein the access terminal is in communication with a first modem pool transceiver of a serving network of a wireless telecommunications system.

FIG. 6A is a network diagram that illustrates the entities that are used in an Internet data connection when an access terminal 110 has a wireless data communication channel open with a single access point 220. In FIG. 6A, the following labels are applied.

In the exemplary Internet data connection, access terminal 110 transmits and receives IP packets embedded within PPP packets by embedding the PPP packets, or portions thereof, into wireless packets that adhere to the wireless protocol.

The entities diagrammed within access point 220A are only those entities that are part of the data path for the Internet data connection. For instance, although only a single MPT, MPT 330AA, is diagrammed, there may be other MPTs 330 within access point 220 that are not part of the Internet data connection in question. DC 430AA has an IP address of $IP_{DCOAA}$ associated with it for use in communicating with NAS 272, and DC 430AA has an IP address of $IP_{DCTAA}$ for use in communicating with one or more instances of MPT 330. MPT 330AA is an instance of MPT 330, earlier described in reference to FIG. 3 and FIG. 5.

Wireless protocol packets are transmitted between MPT 330AA and access terminal 110 over wireless transport 610.

Figure 6B:
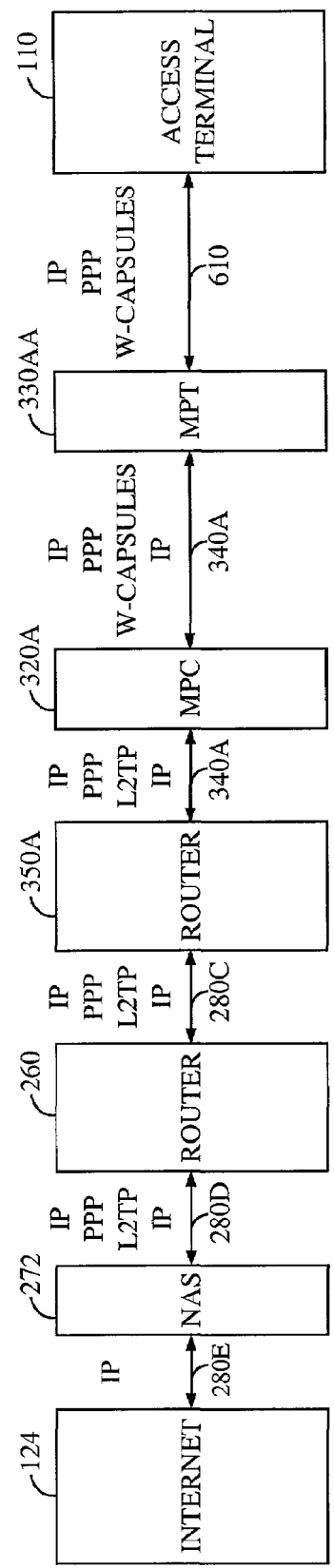
FIG. 6B is a block diagram of the data path taken in relation to FIG. 6A.

FIG. 6B is a diagram showing the exemplary data flow for the Internet data connection adhering to the data path illustrated in FIG. 6A. On the forward link, an IP packet having a destination IP address associated with access terminal 110 travels from Internet 124 over ethernet transport 280E to NAS 272. In NAS 272, the packet is encapsulated in a PPP packet, which is further encapsulated into an L2TP packet with a destination IP address associated with DC 430AA ($IP_{DCOAA}$), located within MPC 320A. L2TP is well known to those skilled in the art of networking, and is described in IETF RFC 2661. This L2TP packet is transmitted over ethernet transport 280D to router 260. Router 260 forwards this L2TP packet over Ethernet transport 280C to router 350A. Router 350A then forwards this L2TP packet over Ethernet transport 340A to its destination of DC 430AA. DC 430AA, located in MPC 320A, receives the L2TP packet and unencapsulates the embedded PPP frame. DC 430AA, then, encapsulates the PPP frame into one or more wireless protocol capsules, which are further encapsulated into IP packets with a destination address associated with MPT 330AA. These IP packets are then transmitted over ethernet link 340A to MPT 330AA. MPT 330AA unencapsulates the wireless protocol capsules from the IP packets and transmits these capsules to access terminal 110 over wireless transport 610.

As is easily understood by one skilled in the art, the opposite path is taken for packets traveling in the direction of the reverse link. It is also easily understood by one skilled in the art that various link layer protocols exist that could be used in lieu of PPP and L2TP.

Figure 7A:
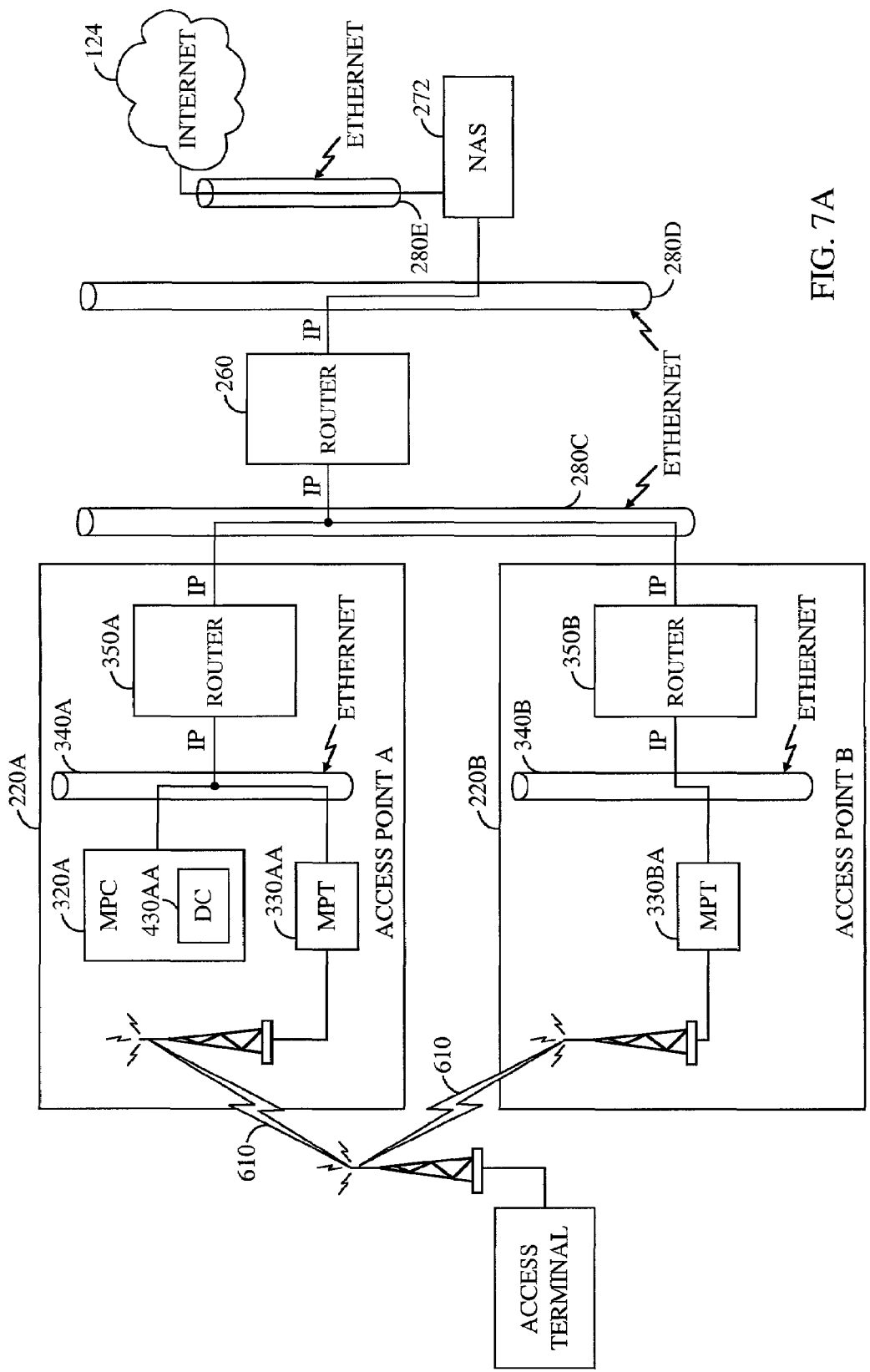
FIG. 7A is a network diagram of an exemplary embodiment of the data path from an access terminal to the internet, wherein the access terminal is in soft-handoff with a first and second modem pool transceiver of a serving network of a wireless telecommunications system.

FIG. 7A is a network diagram that illustrates the entities that are used in an Internet data connection when access terminal 110 has a wireless data communication channel open with two access points 220. In particular, FIG. 7A illustrates the network entities that would be in use if access terminal 110 was previously connected as diagrammed in FIG. 6A, and subsequently access terminal 110 went into a soft-handoff with access point 220B. In FIG. 7A, all labels have the same meaning as they did in reference to FIG. 6A, with the one following exception.

Access point 220B was not present in FIG. 6A. The entities diagrammed within access point 220B are only those entities that are part of the data path for the aforementioned Internet data connection. Wireless protocol packets are transmitted between MPT 330BA and access terminal 110 over transport 610. Although, MPT 330BA is different from MPT 330AA, since access terminal 110 receives an aggregate signal from these MPTs 330, it is considered a single transport 610.

Figure 7B:
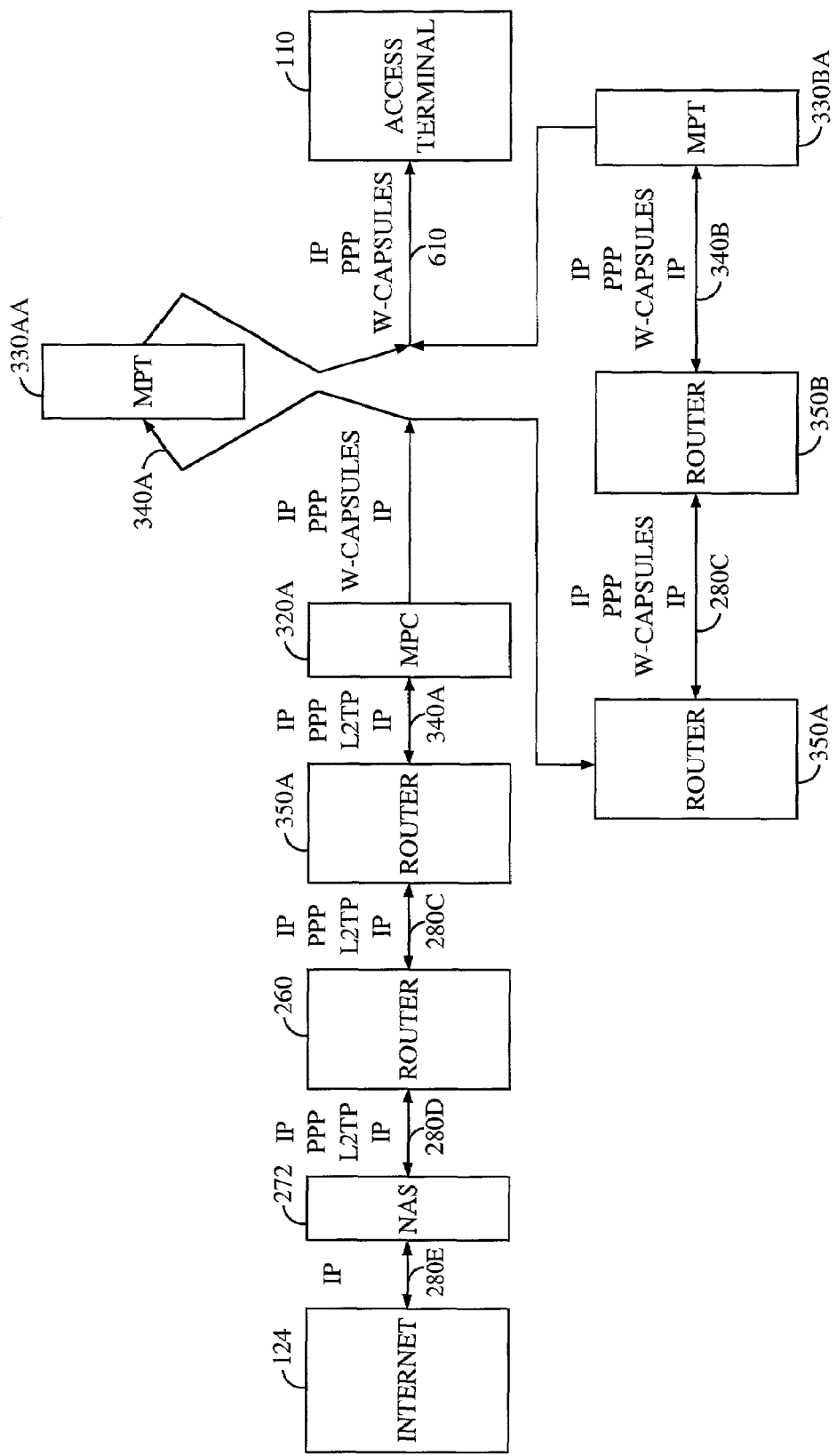
FIG. 7B is a block diagram of the data path taken in relation to FIG. 7A.

FIG. 7B is a diagram showing the exemplary data flow for the Internet data connection adhering to the data path illustrated in FIG. 7A. On the forward link, an IP packet having a destination IP address associated with access terminal 110 travels from Internet 124 over ethernet transport 280E to NAS 272. In NAS 272, the packet is encapsulated in a PPP packet, which is further encapsulated into an L2TP packet with a destination IP address DC 430AA ($IP_{DCOAA}$), located within MPC 320A. This L2TP packet is transmitted over ethernet transport 280D to router 260. Router 260 forwards this L2TP packet over Ethernet transport 280C to router 350A. Router 350A then forwards this L2TP packet over Ethernet transport 340A to its destination of DC 430AA. DC 430AA, located in MPC 320A, receives the L2TP packet and unencapsulates the embedded PPP frame. DC 430AA, then, encapsulates the PPP frame into one or more wireless protocol capsules, which are further encapsulated into IP packets having a destination address (es) associated with MPT 330AA and MPT 330BA.

The packets destined for the IP address associated with MPT 330AA are received by MPT 330AA via ethernet transport 340A. MPT 330AA unencapsulates the wireless protocol capsules from the IP packets and transmits the wireless protocol capsules to access terminal 110 over wireless transport 610 at the times designated in the IP packets.

The packets destined for the IP address associated with MPT 330BA are received by router 350A via Ethernet transport 340A. Router 350A forwards these IP packets over Ethernet transport 280C to router 350B. Router 350B forwards these IP packets over Ethernet transport 340B to its destination of MPT 330BA. MPT 330BA unencapsulates the wireless protocol capsules from the IP packets, and transmits the wireless protocol capsules to access terminal 110 over wireless transport 610 at the time designated in the IP packets.

In one embodiment, the timestamps in the IP packets are such that the same internet payload is transmitted both from MPT 330AA and MPT 330BA over link 610 at the same time.

As is easily understood by one skilled in the art, the opposite path is taken for packets traveling in the direction of the reverse link.

Figure 8A:
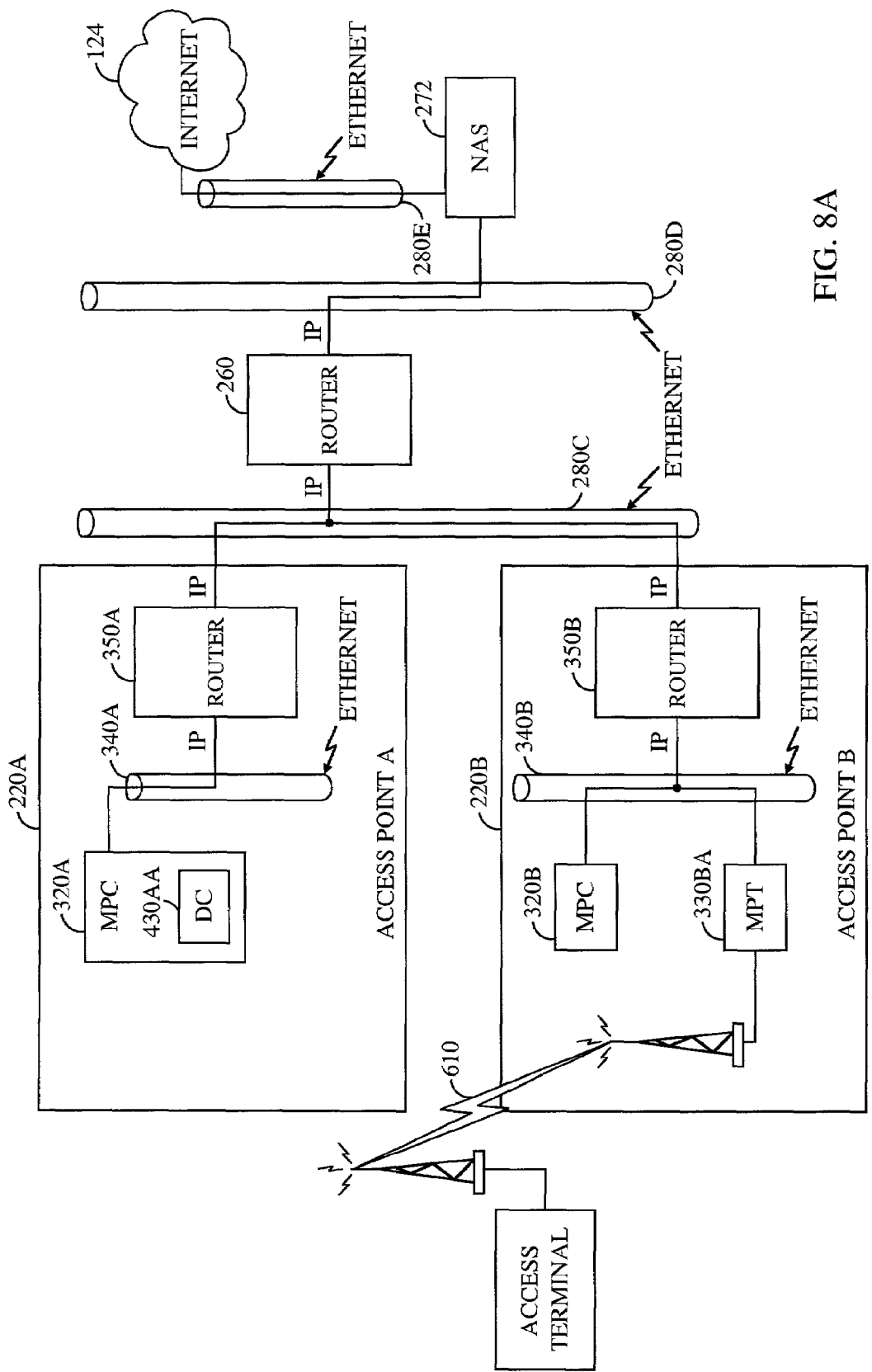
FIG. 8A is a network diagram of an exemplary embodiment of the data path from an access terminal to the internet, wherein the access terminal is in communication with a second modem pool transceiver of a serving network of a wireless telecommunications system, and the anchor point transfer of the present invention has yet to occur.

FIG. 8A is a network diagram that illustrates, with one exception (MPC 320B), the entities that are used for forward and reverse link data flow in an Internet data connection when access terminal 110 has a wireless data communication channel open with a single access point 220B, but in which the capsules received by access point 220B are transmitted to an MPC 320A within another access point 220A. In particular, FIG. 8A illustrates the network entities that would be in use if access terminal 110 was previously connected as diagrammed in FIG. 7A, and subsequently the link between access terminal 110 and access point 220A was terminated. In other words, FIG. 8A can represent the entities associated with a given Internet data connection, just after access terminal 110 completes a soft hand-off. Alternatively, FIG. 8A illustrates the network entities that would be in use if access terminal 110 was previously connected as diagrammed in FIG. 7A, and subsequently a hard-handoff to MPT 330B within access point 220B was performed. In FIG. 8A, all labels have the same meaning as they did in reference to FIG. 7A.

There is one entity diagrammed in FIG. 8A, MPC 320B, the exception mentioned above, which is not used for the forward and reverse link data flow of said Internet data connection. This entity, MPC 320B, is an instance of MPC 320, earlier described in reference to FIG. 3 and FIG. 4. The use of MPC 320B will be further described in reference to FIGS. 9 and 10.

Figure 8B:
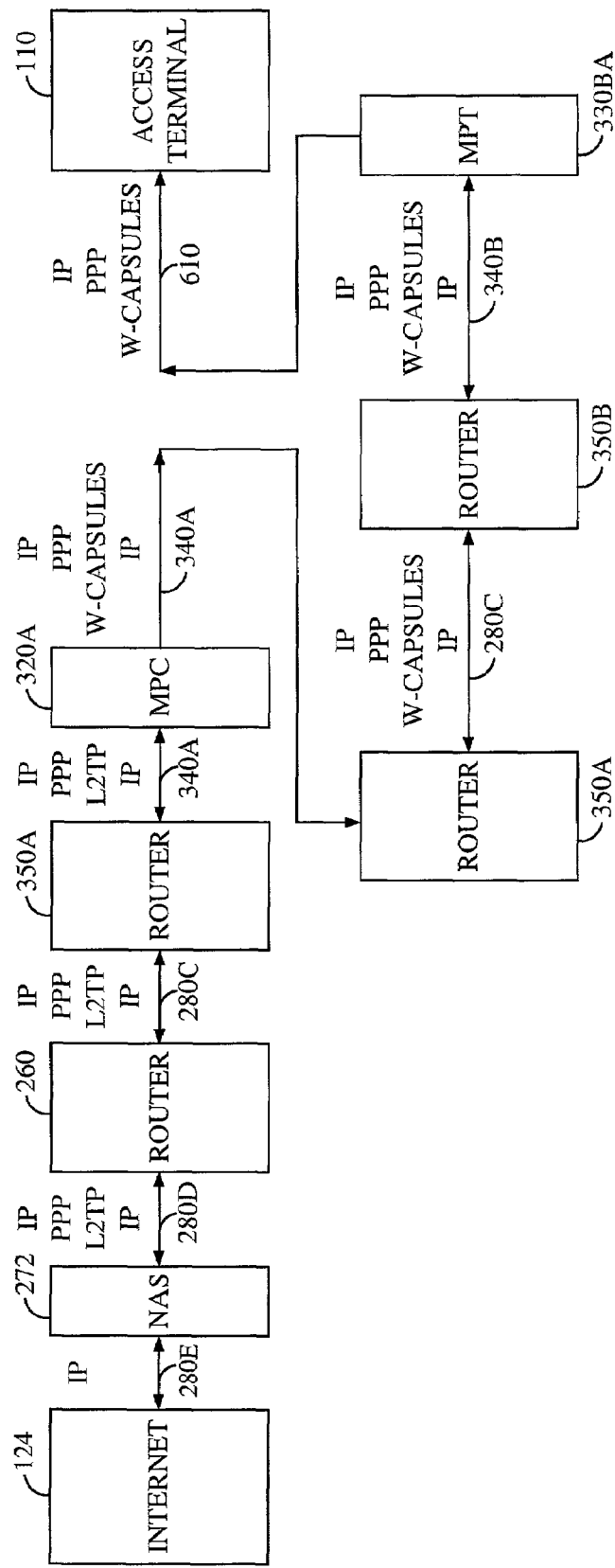
FIG. 8B is a block diagram of the data path taken in relation to FIG. 8A.

FIG. 8B is a diagram showing the exemplary data flow for the Internet data connection adhering to the data path illustrated in FIG. 8A. On the forward link, an IP packet having a destination IP address associated with access terminal 110 is travels from Internet 124 over ethernet transport 280E to NAS 272. In NAS 272, the packet is encapsulated in a PPP packet, which is further encapsulated into an L2TP packet with a destination IP address associated with DC 430AA ($IP_{DCOAA}$), located within MPC 320A. This L2TP packet is transmitted over ethernet transport 280D to router 260. Router 260 forwards this L2TP packet over Ethernet transport 280C to router 350A. Router 350A then forwards this L2TP packet over Ethernet transport 340A to its destination of DC 430AA. DC 430AA, located in MPC 320A, receives the L2TP packet and unencapsulates the embedded PPP frame. DC 430AA, then, encapsulates the PPP frame into one or more wireless protocol capsules, which are further encapsulated into IP packets with a destination address associated with MPT 330BA.

The packets destined for the IP address associated with MPT 330BA are received by router 350A via Ethernet transport 340A. Router 350A forwards these IP packets over Ethernet transport 280C to router 350B. Router 350B forwards these IP packets over Ethernet transport 340B to its destination of MPT 330BA. MPT 330BA unencapsulates the wireless protocol capsules from the IP packets, and transmits the wireless protocol capsules to access terminal 110 over wireless transport 610.

As is easily understood by one skilled in the art, the opposite path is taken for packets traveling in the direction of the reverse link.

Figure 9A:
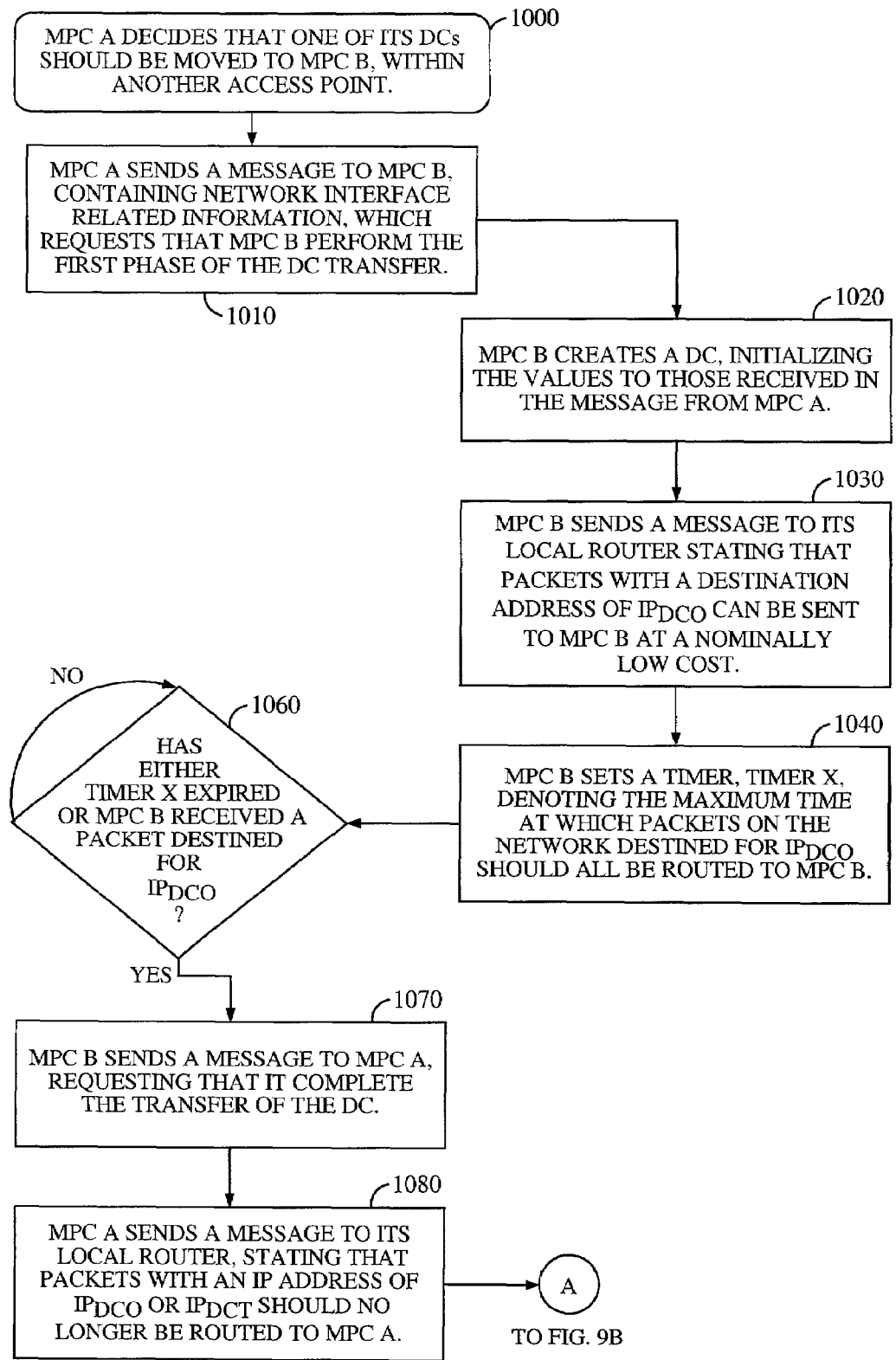
FIGS. 9A-9B are a flowchart illustrating an exemplary embodiment of the anchor point transfer methodology of the present invention.
Figure 9B:
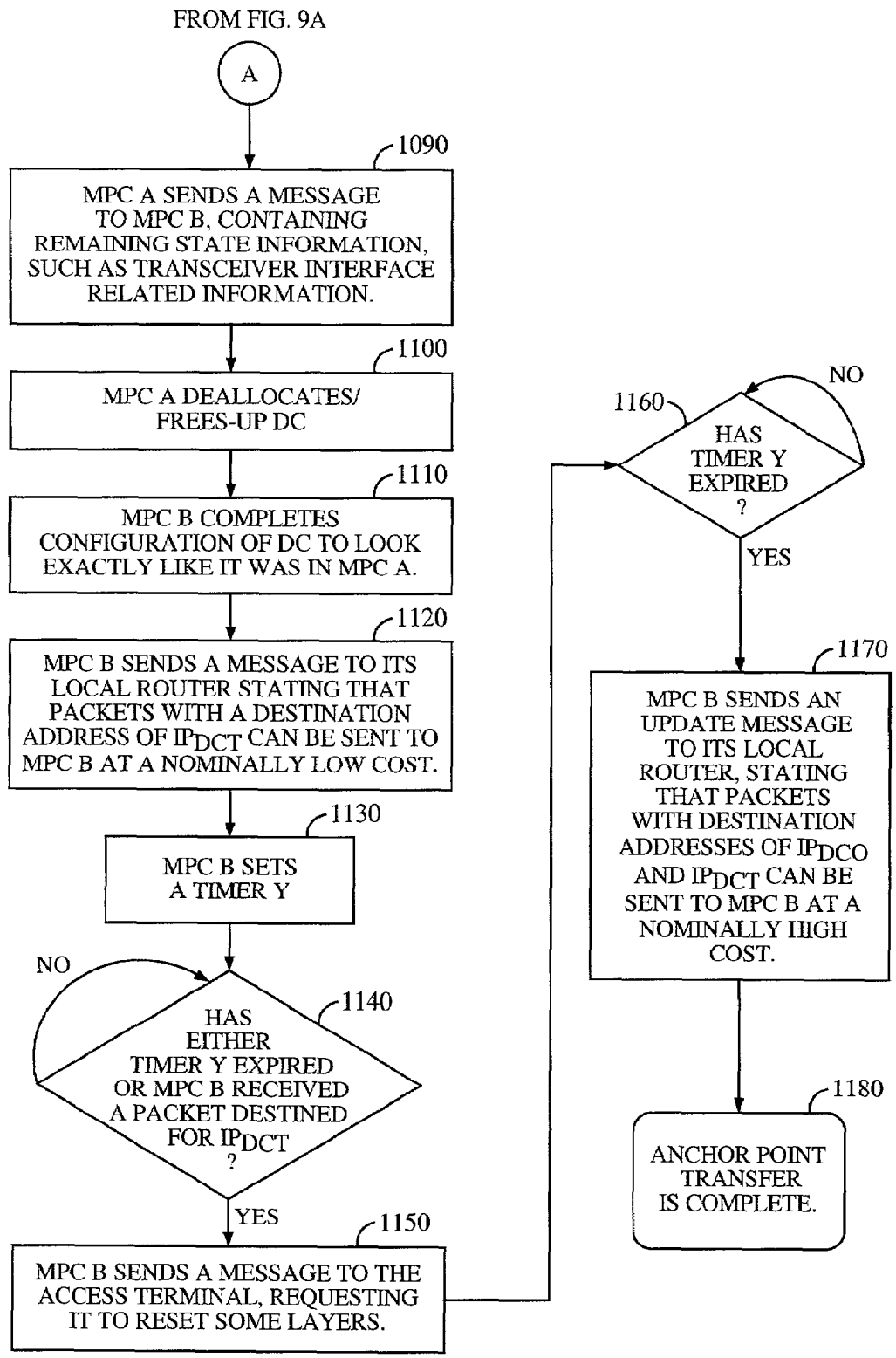

FIGS. 9A-9B are a flowchart illustrating an exemplary embodiment of the anchor point transfer methodology of the present invention. The methodology presents a means by which an entity that exists in one location in a network can be moved to another location in the network, and wherein such methodology results in a very efficient use of the bandwidth of the network.

It is worth noting that at the time at which block 1000 is reached, MPC 320A has the ability to route packets to $IP_{DCOAA}$ at a nominally high cost. This cost, although nominally high, is the lowest cost route associated with the delivery of packets in network 120 to IP address $IP_{DCOAA}$.

Figure 10A:
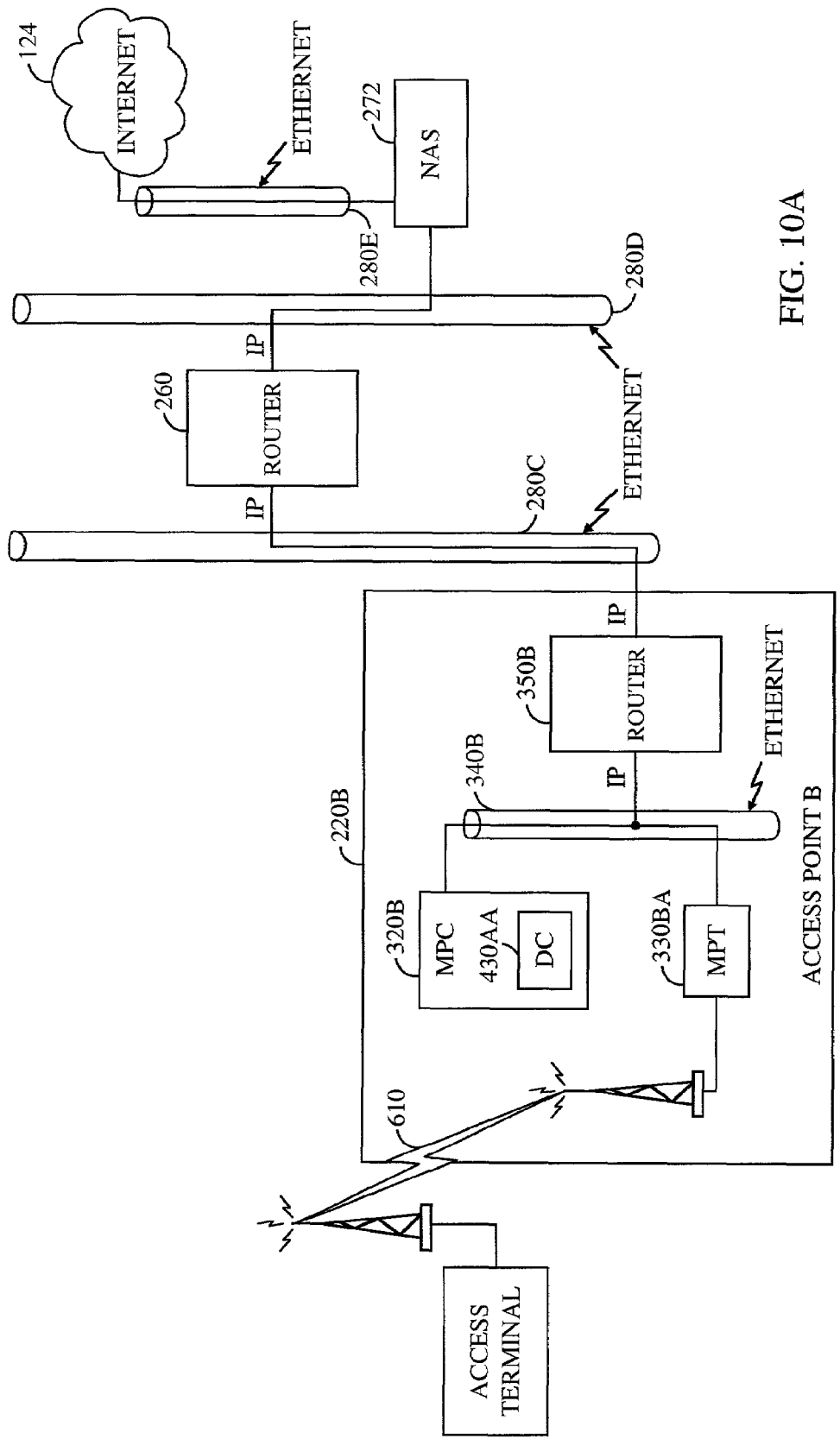
FIG. 10A is a network diagram of an exemplary embodiment of the data path from an access terminal to the internet, wherein the access terminal is in communication with a second modem pool transceiver of a serving network of a wireless telecommunications system, and the anchor point transfer methodology of the present invention has been utilized.
Figure 10B:
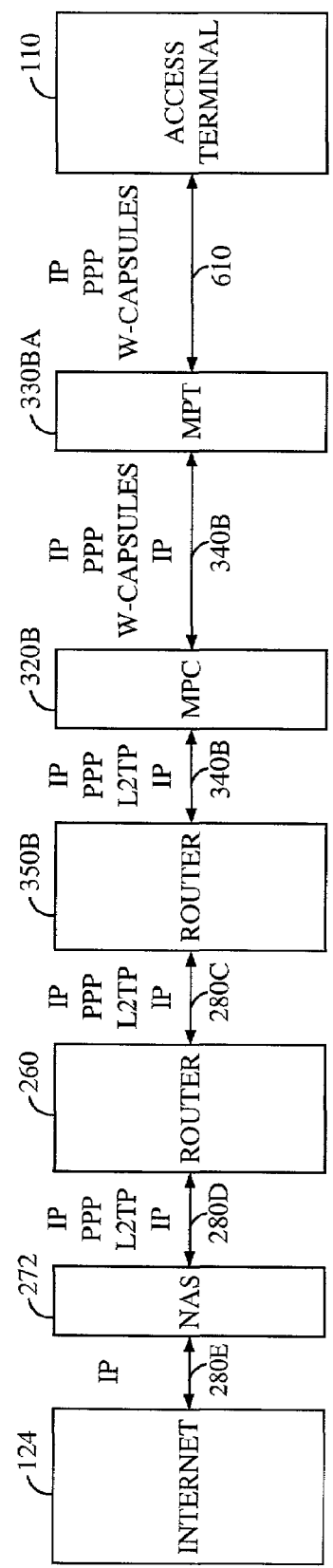
FIG. 10B is a block diagram of the data path taken in relation to FIG. 10A.

In block 1000, a first MPC 320 makes the decision that one of its DCs 430 should be moved to a second MPC 320 within the network. In the exemplary embodiment of the present invention, such a decision would be made when in a Internet data connection, the DC 430 resources of one access point 220 are utilized, but wherein said DC 430 does not communicate with any MPT 330 within the same access point 220. FIGS. 8A and 8B provide illustrations of an exemplary embodiment of a network at an instant in which it is desirable to implement the methodology of the present invention. FIGS. 10A and 10B provide illustrations of an exemplary embodiment of a network at an instant immediately following the utilization of the methodology of the present invention.

For the sake of clarity and simplicity, FIGS. 9A-9B are hereafter described with specific reference to the entities referenced in FIGS. 8A, 8B, 10A, and 10B, whenever possible. However, one skilled in the art will appreciate that the invention herein is not limited to the specific entities or network configurations of those figures. Referencing FIG. 8A, in block 1000, MPC 320A makes the decision to move DC 430AA from MPC 320A to MPC 320B. The process then moves to block 1010.

In block 1010, MPC 320A sends a message to MPC 320B. The message contains a request for MPC 320B to begin setting up a DC 430 that contains network interface related information, such as NAS communication information, equivalent to that in DC 430AA. In the exemplary embodiment, the message contains the L2TP tunnel state information associated with DC 430AA, such as its IP address, $IP_{DCOAA}$, and the Tunnel ID of its L2TP session. The process then moves to block 1020.

In block 1020, MPC 320B receives the message referenced in block 1010. In accordance with the message request, MPC 320B allocates resources for a new DC 430. The new DC 430 is initialized to the L2TP tunnel values received in the aforementioned message. Although this new DC 430, present in MPC 320B has been created and initialized, it is not used in a Internet data connection at this point. The process then moves to block 1030.

In block 1030, MPC 320B sends a message to its local router, router 350B, stating that MPC 320B has the ability to route packets to $IP_{DCOAA}$ at a nominally low cost. In the exemplary embodiment, this message is an OSPF link state advertisement (LSA). In one embodiment, the message sent is an IP broadcast or multicast message, thus allowing a plurality of local routers to receive the message. The routing cost advertised in this message, being nominally low, is lower than the nominally high cost route that is currently associated with MPC 320A. As all of the routers in network 120 are OSPF capable, this new low cost route, for packets having a destination address of $IP_{DCOAA}$, will propagate throughout the routers of network 120. Thus, at some point in the future, after the propagation of the routing information takes place, routers will begin to route packets having a destination address of $IP_{DCOAA}$ to MPC 320B. The process then moves to block 1040.

In block 1040, MPC 320B sets a first timer. The timer is set to a value representative of the maximum amount of time it should take for the low cost route, mentioned in reference to block 1030, to propagate throughout network 120. The process then moves to block 1060.

The methodology of the present invention is such that the process does not move to block 1070 until it can be assured that the propagation of the low cost route throughout network 120 has taken place. The step that is represented by block 1060 is that in which that assurance is gained. In block 1060, MPC 320B checks whether said first timer has expired or whether it has received a packet destined for $IP_{DCOAA}$. If neither event has occurred, the process returns to block 1060, where the same check is again performed. In block 1060, if either said first timer has expired, or MPC 320B has received a packet destined for $IP_{DCOAA}$, then the process moves to block 1070.

In block 1070, MPC 320B sends a message to MPC 320A. The message contains a request that MPC 320A complete the transfer of DC 430AA to MPC 320B.

In block 1080, MPC 320A receives the aforementioned message. In response, MPC 320A sends a message to its local router, stating that packets with an IP destination address of $IP_{DCOAA}$ and packets with an IP destination address of $IP_{DCTAA}$ should no longer be routed to MPC 320A. In the exemplary embodiment, this message is an OSPF LSA. In one embodiment, the message sent is an IP broadcast message, thus allowing a plurality of local routers to receive the message. As all of the routers in network 120 are OSPF capable, the fact that MPC 320A is no longer functioning as a router for packets having destination addresses associated with DC 430AA will propagate throughout the routers of network 120. Thus, at some point in the future, after the propagation of the routing information takes place, routers will no longer associate MPC 320A as a router that can be used when trying to route packets to DC 430AA. The process then moves to block 1090.

In block 1090, MPC 320A sends a message to MPC 320B. The message contains transceiver (e.g., MPT) communication information, such as $IP_{DCTAA}$ and the IP address of MPT 330BA. Additional information useful to the transfer of DC 430AA from MPC 320A to MPC 320B may also be included. In one embodiment, RLP state information is contained in the message. In another embodiment, the wireless protocol's Layer 2 state information is contained in the message. The process then moves to block 1100. Layer 2 is a layer of the telecommunications system that provides for the correct transmission and reception of signaling messages, including partial duplicate detection. This is known to one skilled in the art, and is described in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", incorporated by reference herein, and hereinafter referred to as IS-95-B.

In block 1100, MPC 320A deallocates all of its resources associated with DC 430AA. The process then moves to block 1110.

In block 1110, MPC 320B receives the message that had been transmitted by MPC 320A, described in reference to block 1090. In accordance with the receipt of this message, MPC 320B completes the initialization of the new DC (the one referenced in the description of block 1020) by initializing said new DC to the values received in this message. At this point, said new DC in MPC 320B is configured essentially the same as was DC 430AA in MPC 320A, prior to its deallocation specified in block 1100. Thus, although the new DC in MPC 320B is physically housed in a different location than was DC 430AA, which was housed in MPC 320A, the two DCs are in essence one and the same. Thus, at this point, considering that DC 430AA was deallocated in block 1100, and considering that the new DC is essentially the same as the deallocated one, the new DC in MPC 320B is hereinafter termed DC 430AA, and is illustrated as such in FIG. 10A. The process then moves to block 1120.

In block 11120, MPC 320B sends a message to its local router, router 350B, stating that MPC 320B has the ability to route packets to $IP_{DCTAA}$ at a nominally low cost (a cost lower than the cost previously associated with the routing of this address to MPC 320A). In the exemplary embodiment, this message is an OSPF link state advertisement. As all of the routers in network 120 are OSPF capable, this new low cost route, for packets having a destination address of $IP_{DCTAA}$, will propagate throughout the routers of network 120. Thus, at some point in the future, after the propagation of the routing information takes place, routers will begin to route packets having a destination address of $IP_{DCTAA}$ to MPC 320B. Due to the fact that all such packets originate from MPT 330BA, and the fact that MPT 330BA is on the same subnet as MPC 320B, in all likelihood this operation will be extremely fast. Gratuitous ARP, a term known those skilled in the art of networking, refers to the generation of an unsolicited ARP. In one embodiment, MPC 320B sends a gratuitous ARP message to all other members of its subnet, informing those entities that all packets with at destination address of $IP_{DCTAA}$ should be sent to the ethernet hardware address of MPC 320B. Although not necessary, the use of the gratuitous ARP by itself, or in conjunction with an OSPF message, can decrease the amount of time it takes for packets from MPT 330BA to be routed to MPC 320B. The process then moves to block 1130.

In block 1130, MPC 320B sets a second timer. The timer is set to a value representative of the maximum amount of time it should take for the low cost route, mentioned in reference to block 1120, to propagate throughout network 120. In the exemplary embodiment, this second timer is set to the same value that the first timer was set to in block 1040. The process then moves to block 1140.

The methodology of the present invention is such that the process does not move to block 1150 until it can be assured that the aforementioned propagation of the low cost route throughout network 120 has taken place. The step that is represented by block 1140 is that in which that assurance is gained. In block 1140, MPC 320B checks whether the second timer has expired or whether it has received a packet destined for $IP_{DCTAA}$. If neither event has occurred, the process returns to block 1140, where the same check is again performed. In block 1140, if either the second timer has expired, or MPC 320B has received a packet destined for $IP_{DCTAA}$, then the process moves to block 1150.

In block 1150, MPC 320B sends zero or more messages to access terminal 110 over transport 610. In the exemplary embodiment, the newly initialized DC 430AA contains neither the RLP state nor the wireless Layer 2 state that was present in DC 430AA when it resided in MPC 320A. Thus, in the exemplary embodiment, DC 430AA transmits messages to access terminal 110, requesting that access terminal 110 reset its RLP and wireless Layer 2 layers. In an alternative embodiment, DC 430AA contains all the state information that was contained in DC 430AA when it resided in MPC 320B. In such a case, no messages are transmitted to access terminal 110, in this block 1150. The process then moves to block 1160.

The methodology of the present invention is such that the process does not move to block 1170 until it can be assured that the aforementioned propagation of both low cost routes throughout network 120 has taken place. The step that is represented by block 1160 is that in which that assurance is gained. In block 1160, MPC 320B checks whether the second timer has expired. In the exemplary embodiment, the first timer will always have expired at the point at which the second timer has expired. If the second timer has not expired, the process returns to block 1160, where the same check is again performed. In block 1160, if the second timer has expired, then the process moves to block 1170. In one embodiment, block 1140 is not present, and the process moves straight from block 1150 to block 1170. In another embodiment, block 1160 checks for the expiration of the first timer rather than the second timer.

In block 1170, MPC 320B sends a message to its local router, router 350B, stating that MPC 320B has the ability to route packets to $IP_{DCOAA}$ and $IP_{DCTAA}$ at a nominally high cost. In the exemplary embodiment, this message is an OSPF link state advertisement (LSA). In one embodiment, the message sent is an IP broadcast message, thus allowing a plurality of local routers to receive the message. The routing cost advertised in this message is nominally high. As all of the routers in network 120 are OSPF capable, this new nominally high cost route, for packets having destination addresses of $IP_{DCOAA}$ and $IP_{DCTAA}$, will propagate throughout the routers of network 120. Thus, at some point in the future, after the propagation of the routing information takes place, the routers will replace the nominally low costs associated with routing these packets to MPC 320B with nominally high costs. This step, puts network 120 in a state wherein the methodology of the present invention could once again be used, at a later point in time, to move DC 430AA from MPC 320B to another MPC 320 located within network 120. The process then moves to block 1180.

In block 1180, the process of the methodology of the present invention is complete. One skilled in the art will appreciate that FIGS. 9A-9B provide an ordering of the steps for the exemplary embodiment of the methodology of the present invention. One skilled in the art will appreciate that several of the steps can be reordered without departing from the scope and spirit of the invention.

The exemplary embodiment of the methodology of the present invention is a novel method for moving an entity containing an IP address from one location to another within a network. Not only is this methodology ideal for transparently moving an anchor point within a decentralized serving network of a wireless telecommunications system, but it is also ideal for moving an IP address throughout a corporate or campus network.

The use of OSPF in the exemplary embodiments overcomes some of the drawbacks that might be encountered in a system that uses Mobile IP.

The first drawback of Mobile IP is that IP packets are susceptible to taking very indirect routes. For instance, take the case where a first node moves from its home network to a foreign network, in which a second node already resides. In such an instance, if the second node sends one or more packets to the IP address assigned to the first node, all such packets will be routed from the foreign network to the visiting network, and then tunneled back to the foreign network. The use of these indirect routes introduces latency and causes more bandwidth to be used than would have been had a direct route been taken and no extra tunneling been needed.

The second drawback of Mobile IP is the extra overhead that Mobile IP adds to each packet. In Mobile IP, packets routed from a Home Agent to a Foreign Agent are encapsulated, thus using extra bandwidth to support this overhead.

The third drawback of Mobile IP is its lack of built-in redundancy support. With Mobile IP, if the Home Agent crashes, a mobile node visiting a foreign network will be unable to receive packets, because the existing Mobile IP standards do not address the issue of providing Home Agent redundancy.

The present invention provides mobility within a network using a novel methodology that does not suffer from any of the aforementioned drawbacks. Thus, the invention can provide great efficiencies in networks other than those that function as the serving network of a wireless telecommunications system. Multiple alternative embodiments exist that support the use of the methodology of the present invention in various networks. In one embodiment, an entity containing an IP address, such as a laptop computer, frequently sends a broadcast (or multicast) link state advertisement containing an Age field that is slightly lower than the value of MaxAge. These link state advertisements contain a cost (metric) equal to a constant value that is nominally low. Thus, when the entity moves from one subnet in the network to another, its old advertisements on the old subnet, containing a nominally low metric, quickly reach MaxAge and expire. And, on the new subnet, the new advertisements with the same nominally low metric quickly take hold, allowing packets to be routed to the new location without the need for a tunneling protocol like Mobile IP.

The invention herein uses OSPF as a cost efficient and standardized means for moving an entity throughout a network, which is a novel use when compared to the original intention of the OSPF protocol.

In the narrower scope of the present invention, the methodology that allows for the moving of an anchor point specifically within a wireless telecommunications system, alternative embodiments exist. One such alternative embodiment utilizes Mobile IP to achieve its goal of transparent mobility of an anchor point within a wireless telecommunications system. In such an embodiment, each DC 430 is associated with a plurality of one or more home agents. In one embodiment, the OSPF messages described in reference to FIGS. 9A-9B would be replaced by Mobile IP registration messages that would be sent by each DC 430 upon its movement from one portion of the system to another.

FIG. 10A is a network diagram that illustrates the entities that are used in an Internet data connection when access terminal 110 has a wireless data communication channel open with a single access point 220B after the method of the present invention, described in reference to FIG. 9, has been utilized. In particular, FIG. 10A illustrates the network entities that would be in use if access terminal 110 was previously connected as diagrammed in FIG. 8A, and subsequently the methodology of the present invention, described in reference to FIGS. 9A-9B, was utilized. Alternatively, FIG. 10A illustrates the network entities that would be in use if access terminal 110 was previously connected as diagrammed in FIG. 6A, and subsequently a hard-handoff to access point 220 was performed, in which the methodology of the present invention, described in reference to FIGS. 9A-9B, was utilized. Alternatively, FIG. 10A illustrates the network entities that would be in use if access terminal 110 was previously connected as diagrammed in FIG. 7A, and subsequently a hard-handoff to access point 220 was performed, in which the methodology of the present invention, described in reference to FIGS. 9A-9B, was utilized.

In FIG. 10A, all labels have the same meaning as they did in reference to FIG. 8A, with one exception, as follows. As was explained in reference to FIG. 9, DC 430AA physically located within MPC 320B is a copy of the DC 430AA that was physically located within MPC 320A. Although the DCs exist within different MPCs and therefore use a different pool of resources, and could therefor have been given different labels, the DCs are given the same label of 430AA. This is done to illustrate that both of the aforementioned DCs have all of the same attributes, including IP addresses, and perform the same functions, irrespective of their different locations.

FIG. 10B is a diagram showing the exemplary data flow for the Internet data connection adhering to the data path illustrated in FIG. 10A. On the forward link, an IP packet having a destination IP address associated with access terminal 110 is travels from Internet 124 over ethernet transport 280E to NAS 272. In NAS 272, the packet is encapsulated in a PPP packet, which is further encapsulated into an L2TP packet with a destination IP address associated with DC 430AA ($IP_{DCOAA}$), which has been relocated to MPC 320B. This L2TP packet is transmitted over ethernet transport 280D to router 260. Router 260 forwards this L2TP packet over Ethernet transport 280C to router 350B. Router 350B then forwards this L2TP packet over Ethernet transport 340B to its destination of DC 430AA. DC 430AA, located in MPC 320B, receives the L2TP packet and unencapsulates the embedded PPP frame. DC 430AA, then, encapsulates the PPP frame into one or more wireless protocol capsules, which are further encapsulated into IP packets with a destination address associated with MPT 330AA. These IP packets are then transmitted over ethernet link 340A to MPT 330AA. MPT 330AA unencapsulates the wireless protocol capsules from the IP packets and transmits the wireless protocol capsules to access terminal 110 over wireless transport 610.

As is easily understood by one skilled in the art, the opposite path is taken for packets traveling in the direction of the reverse link.

Figure 11:
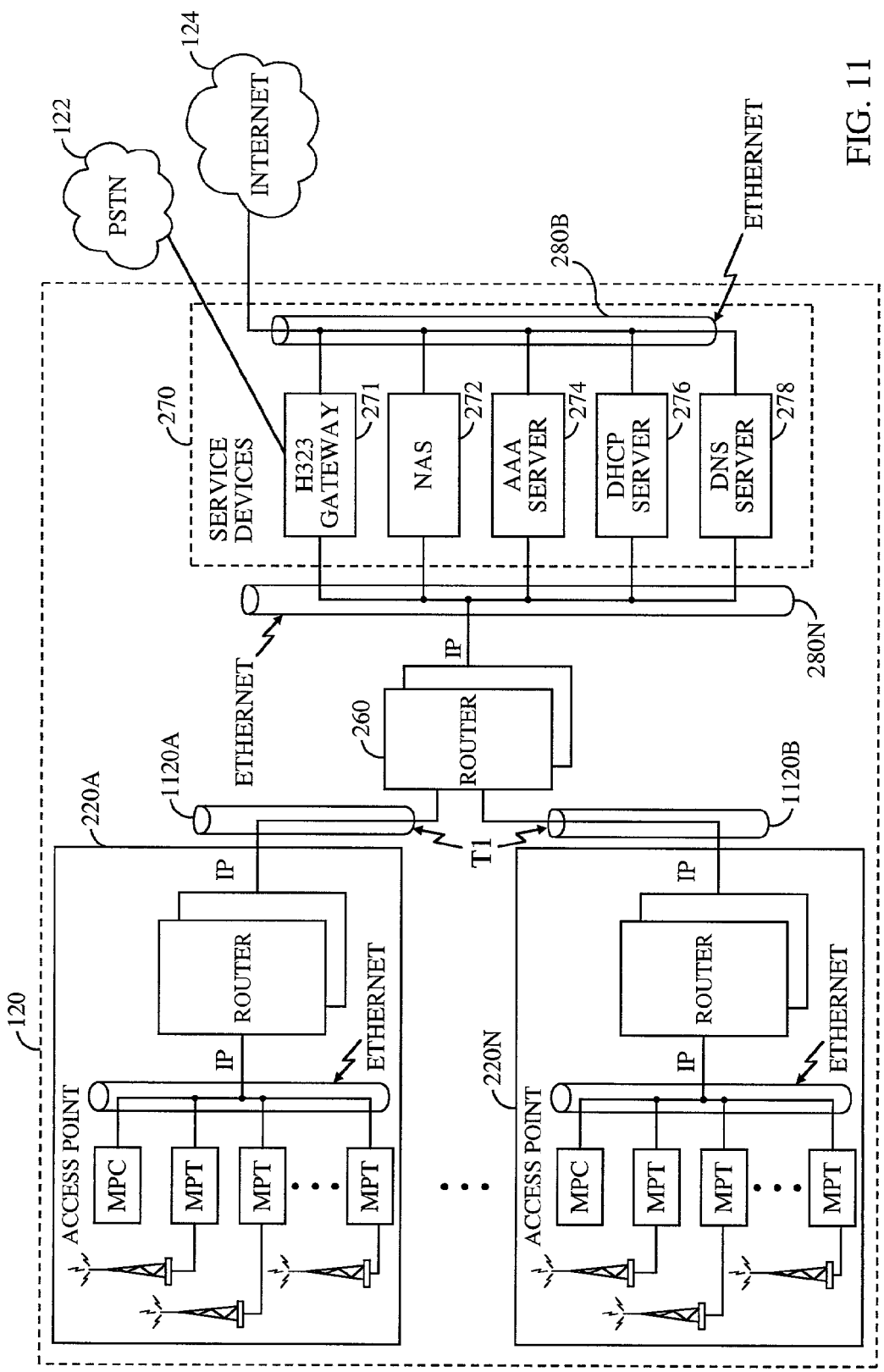
FIG. 11 is a functional block diagram of a preferred embodiment of a decentralized serving network of a wireless telecommunications system.

FIG. 11 is a functional block diagram of a preferred embodiment of a decentralized serving network of a wireless telecommunications system. This preferred embodiment is an alternate embodiment to the exemplary embodiment illustrated in FIG. 2. This preferred embodiment differs from the exemplary embodiment as follows.

In FIG. 11, access points 220 communicate with external devices in network 120 via transport T1 1120. This contrasts to FIG. 2, in which access point 220 communicates with external devices in network 120 via ethernet 280. It is easily understood by one skilled in the art that transport T1 1120 is one of a variety of transports, such as E1or microwave, which can be used for connecting access points 220.

In FIG. 11, packets sent from one access point 220A to another access point 220N must first travel through one or more routers 260. This is because, as illustrated, each access point is on its own physical subnet. This contrasts with FIG. 2, in which packets can be sent directly from one access point 220 to another access point 220 over a single transport. As illustrated in the exemplary embodiment, FIG. 2, this is possible in the exemplary embodiment because transport 280 connects to all access points 220. It is easily understood by one skilled in the art that in a network containing more than one subnet, each subnet need not be restricted to a single access point 220. In other words, it is easily understood by one skilled in the art that some subnets can contain exactly one access point 220, while others contain more than one access point 220.

It is also easily understood by one skilled in the art that each access point in a network 120 need not use the same physical transport to communicate to other devices in the network. For example, a network 120 could be designed such that one access point 220D communicates with a router 260 via a T1 transport, while another access point 220E communicates with a router 260 via an E1 transport, while another access point 220F communicates with a router 260 via another transport, such as ethernet.

Finally, it is easily understood by one skilled in the art that the methodology of the present invention, described herein, works in all such embodiments of network 120. In all such embodiments, the methodology of the present invention, described in reference to FIGS. 9A-9B, remains the same. This is because the methodology of the present invention was designed to be flexible enough such that it would work in a variety of network configurations.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for providing mobility comprising the steps of:
   transferring an anchor point from a first entity of a wireless network to a second entity of the wireless network during an active session between an access terminal and a peer entity in the wireless network, wherein the access terminal communicates with the peer entity through the anchor point during the active session, and wherein the anchor point is at the first entity before the step of transferring, comprising
   setting up the anchor point at the second entity;
   transmitting a first OSPF link state advertisement stating that packets with a first destination address of the anchor point can be sent to the second entity at a first nominally low cost, the first nominally low cost being lower than current nominally high cost of routing the packets with the first destination address to the first entity;
   transmitting a second OSPF link state advertisement stating that packets with the first destination address of the anchor point and packets with a second destination address of the anchor point should no longer be routed to the first entity;
   transmitting a third OSPF link state advertisement stating that the packets with the second destination address can be sent to the second entity at a second nominally low cost, the second nominally low cost being lower than a nominally high cost of routing the packets with the second destination address to the first entity; and
   transmitting a fourth OSPF link state advertisement stating that the packets with the first and second destination addresses can be sent to the second entity at a nominally high cost, wherein the step of transmitting the fourth OSPF link state advertisement is performed after propagation of routes for delivering the packets with the first and second destination addresses at the first and second nominally low costs.

2. The method of claim 1, wherein said step of setting up comprises:
   sending a first message from the first entity to the second entity, the first message comprising network interface information and request to perform a first phase of anchor point transfer.

3. The method according to claim 1, wherein said step of transferring an anchor point further comprises:
   deallocating resources associated with said anchor point at the first entity; and
   initializing the anchor point at the second entity.

4. The method according to claim 1, wherein said step of transferring an anchor point further comprises:
   changing intervals at which said link advertisements are transmitted.

5. The method according to claim 1, wherein said step of transferring an anchor point further comprises:
   setting a first timer representing the maximum amount of time it should take for a low cost route to propagate throughout the wireless network; and
   sending an ARP message informing entities that all packets with the second destination address may be sent to the second entity.

6. The method according to claim 1, wherein said step of transferring, an anchor point further comprises:
   deallocating resources associated with said anchor point at the first entity;
   initializing the anchor point at the second entity;
   changing interval at which said link state advertisements are transmitted;
   setting a first timer representing the maximum amount of time it should take for a low cost route to propagate throughout the wireless network; and
   sending an ARP message informing entities of the subnet of the second entity that all packets with the second destination address may be sent to the second entity.

7. The method of claim 1, further comprising deleting an instance of a dedicated controller in a modem pool controller (MPC).

8. The method of claim 1, further comprising deleting an instance of a dedicated transmitter in a modem pool transceiver (MPT).

9. An apparatus for providing mobility within a network comprising:
   at least one component adapted to transfer an anchor point from a first entity of a wireless network to a second entity of the wireless network during an active session between an access terminal and a peer entity in the wireless network, wherein the terminal communicates with the peer entity through the anchor point during the active session, and wherein the point is at the first entity before the anchor point is transferred, the at least one component being configured to steps comprising:
   set up the anchor point at the second entity;
   transmitting a first link state advertisement stating that packets with a first destination address of the anchor point can be sent to the second entity at a first nominally low cost, the first nominally low cost being lower than current nominally high cost of routing the packets with the first destination address to the first entity;
   transmitting a second link state advertisement stating that packets with the first destination address of the anchor point and packets with second destination address of the anchor point should no longer be routed to the first entity;
   transmitting a third link state advertisement stating that the packets with the second destination address can be sent to the second entity at a second nominally low cost, the second nominally low cost being lower than a nominally high cost of routine the packets with the second destination address to the first entity, and transmitting a fourth link state advertisement stating that the packets with the first and second destination addresses can be sent to the second entity at a nominally high cost, wherein the step of transmitting the fourth link state advertisement is performed after propagation of routes for delivering the packets with the first and second destination addresses at the first and second nominally low costs.

10. The apparatus of claim 9 further comprising a user interface that allows the intervals at which said link advertisements are transmitted to be changed.

11. The apparatus of claim 10, wherein said advertisements are OSPF link state advertisements.

12. The apparatus according to claim 9, wherein said at least one component is further adapted to:
deallocate resources associated with said anchor point at the first entity; and
initialize the anchor point at the second entity.

13. The apparatus according to claim 9, wherein said at least one component is further adapted to:
change intervals at which said link advertisements are transmitted.

14. The apparatus according to claim 9, wherein said at least one component is further adapted to:
set a first timer representing the maximum amount of time it should take for a low cost route to propagate throughout the wireless network; and
send an ARP message informing entities that all packets with the second destination address may be sent to the second entity.

15. The apparatus according to claim 9, wherein said at least one component is further adapted to:
deallocate resources associated with said anchor point at the first entity;
initialize the anchor point at the second entity;
change intervals at which said link advertisements are transmitted;
set a first timer representing the maximum amount of time it should take for a low cost route to propagate throughout the wireless network; and
send an ARP message informing entities of the subnet of the second entity that all packets with the second destination address may be sent to the second entity.

16. A means for providing mobility within a network comprising:
means for transferring an anchor point from a first entity of a wireless network to a second entity of the wireless network during an active session between an access terminal and a peer entity in the wireless network, wherein the access terminal communicates with the peer entity through the anchor point during the active session, comprising
means for setting up the anchor point at the second entity;
means for transmitting a first OSPF link state advertisement stating that packets with a first destination address of the anchor point can be sent to the second entity at a first nominally low cost, the first nominally low cost being lower than current nominally high cost of routing the packets with the first destination address to the first entity;

means for transmitting a second OSPF link slate advertisement stating that packets with the first destination address of the anchor point and packets with a second destination address of the anchor mint should no longer be routed to the first entity;

means for a third OSPF link state advertisement stating that the packets with the second destination address can be sent to the second entity at a second nominally low cost, the second nominally low cost being lower than a nominally high cost of routing the packets with the second destination address to the first entity;

means for transmitting a fourth OSPF link state advertisement stating that the packets with the first and second destination addresses can he sent to the second entity at a nominally high cost, wherein the step of transmitting the fourth OSPF link state advertisement is performed after propagation of routes for delivering the packets with the first and second destination addresses at the first and second nominally low costs.

17. The means for providing mobility within a network according to claim 16, wherein said means for transferring an anchor point further comprises:
means for deallocating resources associated with said anchor point at the first entity; and
means for initializing the anchor point at the second entity.

18. The means for providing mobility within a network according to claim 16, wherein said means for transferring an anchor point further comprises:
means for changing intervals at which at least some of said first, second, third, and fourth link advertisements are transmitted.

19. The means for providing mobility within a network according to claim 16, wherein said means for transferring an anchor point further comprises:
means for setting a first timer representing the maximum amount of time it should take for a low cost route to propagate throughout the wireless network; and
means for sending an ARP message informing entities that all packets with the second destination address may he sent to the second entity.

20. The means for providing mobility within a network according to claim 16, wherein said means for transferring an anchor point further comprises:
means for deallocating resources associated with said anchor point at the first entity;
means for initializing the access point at the second entity;
means for changing intervals at which at least some of the first, second, third, and fourth link state advertisements are transmitted;
means for setting a first timer representing the maximum amount of time it should take for a low cost route to propagate throughout the wireless network; and
means for sending an ARP message informing all entities belonging to the same subnet as the second entity that all packets with the second destination address of said anchor point may be sent to the second entity.

* * * * *